US006461798B1

(12) United States Patent
Ohkuma et al.

(10) Patent No.: US 6,461,798 B1
(45) **Date of Patent: *Oct. 8, 2002**

(54) PROCESS FOR THE PRODUCTION OF AN INK JET HEAD

(75) Inventors: Norio Ohkuma; Masashi Miyagawa, both of Yokohama; Hiroaki Toshima, Tokyo, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 65 days.

(21) Appl. No.: 08/626,110

(22) Filed: Apr. 1, 1996

(30) Foreign Application Priority Data

Mar. 31, 1995 (JP) ........................................... 7-076006

(51) Int. Cl.[7] ......................... G03C 5/00; G01D 15/00; G11B 5/127; B21D 53/76

(52) U.S. Cl. ......................... 430/320; 430/327; 216/27; 29/890.1

(58) Field of Search ............................... 430/320, 327; 216/27; 29/890.1

(56) References Cited

U.S. PATENT DOCUMENTS

| | | | | | |
|---|---|---|---|---|---|
| 4,450,455 A | | 5/1984 | Sugitani et al. | ......... | 346/140 R |
| 4,657,631 A | | 4/1987 | Noguchi | ..................... | 156/655 |
| 4,936,952 A | * | 6/1990 | Komuro | ..................... | 156/643 |
| 5,016,024 A | * | 5/1991 | Lam et al. | ................... | 346/1.1 |
| 5,290,667 A | * | 3/1994 | Shiba et al. | ................ | 430/328 |
| 5,331,344 A | | 7/1994 | Miyagawa et al. | ........... | 347/63 |
| 5,334,999 A | * | 8/1994 | Kashiwazaki et al. | ........ | 347/65 |
| 5,458,254 A | | 10/1995 | Miyagawa et al. | ........... | 216/27 |
| 5,478,606 A | * | 12/1995 | Ohkuma et al. | ............ | 427/555 |
| 5,945,260 A | * | 8/1999 | Miyagawa et al. | ......... | 430/320 |

* cited by examiner

*Primary Examiner*—Steven H. Ver Steeg
(74) *Attorney, Agent, or Firm*—Fitzpatrick, Cella, Harper & Scinto

(57) ABSTRACT

A process for producing an ink jet head having an ink pathway communicating with a discharging outlet and an energy generating element for generating energy utilized for discharging ink. The process includes providing a substrate with an energy generating element disposed thereon; forming on the substrate and energy generating element a photosensitive layer comprised of an ionizing radiation decomposable photosensitive resin containing a crosslinkable structural unit; subjecting the photosensitive resin layer to crosslinking treatment to produce a crosslinked photosensitive layer; forming a coating resin layer on the crosslinked photosensitive layer; hardening the coating resin layer; irradiating ionizing radiation to the crosslinked photosensitive layer through the hardened coating resin layer to decompose the crosslinked photosensitive layer corresponding to the ink pathway in communication with a discharging outlet; and eluting the irradiated crosslinked photosensitive layer to thereby form the ink pathway.

25 Claims, 17 Drawing Sheets

PROCESS FOR THE PRODUCTION OF AN INK JET HEAD

BACKGROUND OF THE INVENTION

1. Field of the Invention

The present invention relates to a process for producing an ink jet head for discharging ink which is used in an ink jet printing system. More particularly, the present invention relates to a process which enables one to efficiently form a precise ink pathway with no deformation for an ink jet head and to attain the mass-production of a high quality ink jet head at a high yield by way of a process for producing an ink jet head which includes the steps of forming a photosensitive resin layer capable of contributing to the formation of an ink pathway on a substrate for an ink jet head, forming a coating resin layer on said photosensitive resin layer, and removing a predetermined ink pathway-forming portion of said photosensitive resin layer by way of elution to form an ink pathway.

2. Related Background Art

There are known a number of ink jet heads used in an ink jet printing system (or a liquid jet recording system) for performing printing. These ink jet heads are usually provided with a discharging outlet (which will be hereinafter occasionally called an orifice) for discharging printing liquid (ink), an ink pathway communicated with said discharging outlet and an energy generating element for generating energy utilized for discharging said ink.

As for the production of such ink jet head, there is known a process wherein fine grooves for the formation of ink pathways are formed at a given plate made of glass, metal or the like by way of cutting processing or etching processing, and the plate having the thus formed fine grooves is joined with a substrate for an ink jet head which is provided with discharging energy-generating elements to form ink pathways. However, as for this process for the production of an ink jet head, there are such problems as will be described as follows. In the case where the formation of said fine grooves is by way of the cutting processing, problems entail in that it is difficult for each of the fine grooves to have a smooth inner wall face, a crack or/and breakage are liable to occur at the plate, and therefore, a desirable yield cannot be attained. In the case where the formation of said fine grooves is by way of the etching processing, problems entail in that it is difficult to attain a uniformly etched state for all the fine grooves obtained, and the process for practicing the etching processing is complicated, resulting in an increase in the production cost. Therefore, there is a tendency for ink jet heads produced according to the above process for the production of an ink jet head to be varied in printing characteristics and therefore, the above process for the production of an ink jet head is difficult to stably mass-produce a desirable ink jet head having ink pathways having a uniform pattern at a high yield. In addition, as for the above process for the production of an ink jet head, there is also a problem in that upon joining the plate having the fine grooves with the substrate for an ink jet head, precise positioning between the two members cannot be easily conducted. Consequently, the above process for the production of an ink jet head is not suitable for the mass-production of a high quality ink jet head at a high yield.

In order to eliminate the problems in the foregoing process for the production of an ink jet head, U.S. Pat. No. 4,450,455 (hereinafter referred to as document 1) discloses a process for the production of a liquid jet recording head (that is, an ink jet head) which comprises providing a substrate for an ink jet head which is provided with energy generating elements disposed thereon, forming a dry film composed of a photosensitive resin material on the substrate for an ink jet head, forming grooves for the formation of ink pathways at the dry film by way of photolithography, joining a top plate made of glass or the like to the substrate for an ink jet head which is provided with the grooves using an adhesive to obtain a joined body, and mechanically cutting an end portion of the joined body to form discharging outlets, thereby obtaining an ink jet head.

The process for the production of an ink jet head described in document 1 has advantages in that as the grooves for the formation of ink pathways are formed by way of photolithography, the grooves can be precisely formed as desired; and the joining of the substrate for an ink jet head to the top plate can be easily conducted without the necessity of severely positioning the two members since the grooves for the formation of ink pathways are previously formed at the energy generating elements-bearing substrate for an ink jet head prior to joining the substrate to the top plate. However, as for the process for the production of an ink jet head described in document 1, there are such disadvantages as will be described as follows: (1) in the step of joining the substrate for an ink jet head to the top plate, the adhesive is liable to get in the ink pathways formed, wherein there is a tendency for the resulting ink pathways to be deformed; (2) in the step of mechanically cutting the joined body in order to form the discharging outlets, a swarf caused during the mechanical cutting is liable to get in the ink pathways, wherein the resulting ink jet head is liable to suffer from clogging during the operation thereof for performing printing; and (3) since the ink pathway-forming portions of the joined body are caved, some of the discharging outlets formed by mechanically cutting the joined body are liable to be accompanied with a breakage.

Consequently, the process for the production of an ink jet head described in document 1 is also not suitable for the mass-production of a high quality ink jet head at a high yield.

In order to eliminate these problems, U.S. Pat. No. 4,657,631 (hereinafter referred to as document 2) discloses a process for the production of an ink jet head which comprises providing a substrate for an ink jet head which is provided with energy generating elements disposed thereon, forming a resin pattern (that is, a resin solid layer) composed of a solubilizable resin at a predetermined ink pathway-forming portion on the substrate for an ink jet head, forming a coating resin layer composed of epoxy resin or the like so as to cover the resin solid layer on the substrate for an ink jet head, hardening the coating resin layer, and removing the resin solid layer by eluting it to form ink pathways, thereby obtaining an ink jet head. In addition, U.S. Pat. No. 5,331,344 (hereinafter referred to as document 3) discloses a process for the production of an ink jet head which comprises providing a substrate for an ink jet head which is provided with, energy generating elements disposed thereon, forming a two-layered photosensitive layer comprising a first photosensitive layer and a second photosensitive layer on the substrate for an ink jet head, forming a latent image pattern for the formation of ink pathways at the first photosensitive layer while forming a latent image pattern for the formation of discharging outlets at the second photosensitive layer, and developing these two latent image patterns at the same time, thereby obtaining an ink jet head. Further, U.S. Pat. No. 5,458,254 (hereinafter referred to as document 4) discloses a process for the production of an ink jet head based on the process described in document 2 wherein an ionizing radiation decomposable photosensitive resin is used as the constituent resin of the resin pattern (the resin solid layer) in the process described in document 2.

In any of the processes described in documents 2, 3 and 4, a solubilizable resin layer is disposed at a predetermined ink pathway-forming portion on the substrate for an ink jet head and a coating resin layer is disposed on the solubilizable resin layer while maintaining the resin layer as it is, and the resin layer is removed by way of elution, wherein desired ink pathways can be precisely formed without being deformed and without the incorporation of an adhesive into the ink pathways which occurs in the case of the process for the production of an ink jet head described in document 1. Further, in the case where an end portion of the substrate for an ink jet head which is provided with the coating resin layer thereon should be mechanically cut as in the process described in document 1, since the solubilizable resin is charged in the ink pathway-forming portion, a swarf caused upon the cutting operation is prevented from getting into the resulting ink pathways and the resulting discharging outlets are prevented from suffering from a breakage.

In documents 2, 3 and 4, as the solubilizable resin, there is used a positive type resist in view of easiness for removal. The positive type resist is capable of forming a desired pattern by virtue of a difference between the solution velocity of an exposed portion and that of a non-exposed portion. In any of the processes described in documents 2, 3 and 4, the ink pathway-forming portion is subjected to exposure and thereafter, it is removed by way of elution.

In any of the processes described in documents 2, 3 and 4, the formation of the coating resin layer on the ink pathway-forming portion is conducted by way of so-called solvent-coating process. The solvent-coating process is conducted in a manner of dissolving a resin, which is to be applied onto an object, in a given solvent and applying the resultant liquid onto the object. The solvent-coating process is typically represented by spin coating process. The spin coating process has an advantage in that a film having a uniform thickness can be relatively easily formed.

Now, particularly in the process for the production of an ink jet head of a so-called side shooter type which has a discharging outlet above an electrothermal converting body as an energy generating element capable of generating energy utilized for discharging ink, said discharging outlet is formed at the coating resin layer and therefore, the thickness of the coating resin layer is an important factor of deciding the distance between the electrothermal converting body and the discharging outlet which governs the ink discharging characteristics of the ink jet head. In view of this, the formation of the coating resin layer in the production of a side shooter type ink jet head is usually conducted by the spin coating process.

In the case of forming the coating resin layer by the solvent-coating process, as the solubilizable resin layer, comprised of the positive type resist which corresponds to the ink pathway-forming portion, is previously disposed as above described, it is important to pay careful attention to the solvent to be used. Particularly when as the solvent used in the solvent-coating process, a solvent having a excessively strong dissolving power is used, there is a tendency in that the exposed portion of the solubilizable positive type resist is dissolved while the non-exposed portion thereof is partly dissolved, wherein the resulting ink pathways are liable to be accompanied with a deformation.

By the way, in order to form a film on a substrate for an ink jet head at a uniform thickness by the solvent-coating process (that is, the spin coating process), it is necessary to properly adjust the evaporation rate and viscosity of a solvent used. As the film thus formed in the ink jet head field, it is usually made to have a thickness which is thicker than that of a film formed in the semiconductor device field. Therefore, in order to form such thick film at a uniform thickness in the ink jet head field, related film-forming conditions are necessary to be more severely controlled in comparison with the case of forming the film in the semiconductor device field.

As the thickness of the coating resin film governs the discharging characteristics of the resulting ink jet head as above described, the adjustment of the evaporation rate and viscosity of the solvent used eventually affects the yield of an ink jet head obtained. Particularly the use of a solvent having a low evaporation rate can easily attain the formation of a film at a uniform thickness. However, solvents having a low evaporation rate are mostly strong in dissolving power. In the foregoing conventional processes for the production of an ink jet head, when a solvent having a strong dissolving power is used upon the application of a given resin for the formation of the coating resin layer, a deformation is liable to occur at the resulting ink pathways, resulting in reducing the yield of an ink jet head obtained. This situation makes it difficult to attain an improvement in the productivity of an ink jet head.

Consequently, in accordance with any of the conventional processes for the production of an ink jet head which includes the steps of forming a photosensitive resin layer contributing to the formation of an ink pathway on a substrate for an ink jet head, forming a coating resin layer on the photosensitive resin layer, and removing a predetermined ink pathway-forming portion of the photosensitive resin layer by way of elution to form an ink pathway, there is a problem in that it is difficult to efficiently form a precise ink pathway with no deformation for an ink jet head and to attain the mass-production of a high quality ink jet head at an improved yield.

SUMMARY OF THE INVENTION

The present inventors conducted extensive studies through experiments in order to solve the foregoing problems in the prior art and in order to attain a process which enables one to effectively form an ink pathway with no deformation even when a solvent having a strong dissolving power is used upon forming the coating resin layer by way of the coating process, and to mass-produce a high quality ink jet head at an improved yield.

As a result, there was obtained the following finding. That is, when a photosensitive layer composed of an ionizing radiation decomposable photosensitive resin containing a crosslinkable structural unit is formed at a predetermined ink pathway-forming portion on a substrate for an ink jet head, the photosensitive layer is crosslinked, a coating resin layer is formed on the crosslinked photosensitive layer, and ionizing radiation is irradiated to a predetermined portion of the crosslinked photosensitive layer which contributes to the formation of an ink pathway through the coating resin layer, the above aims can be effectively attained as desired. The present invention has been accomplished based on this finding.

An object of the present invention is to provide a process which enables one to efficiently produce a high quality ink jet head having a highly precise ink pathway at a high yield.

Another object of the present invention is to provide a process which enables one to efficiently produce a high quality ink jet head having a highly precise ink pathway with no deformation at a high yield even when the coating resin layer is formed by the coating process while using a solvent having a strong dissolving power.

A further object of the present invention is to provide a process which enables one to efficiently produce a high quality ink jet head having a highly precise ink pathway at a high yield without a substantial limitation for the resin by which the coating resin layer is constituted and also for the solvent used upon forming the coating resin layer by the coating process.

A still further object of the present invention is to provide a process which enables one to efficiently produce a high quality ink jet head having a highly precise ink pathway at a high yield while easily attaining uniformity for the thickness of the coating resin layer.

DESCRIPTION OF THE INVENTION AND PREFERRED EMBODIMENTS

Figure 1:
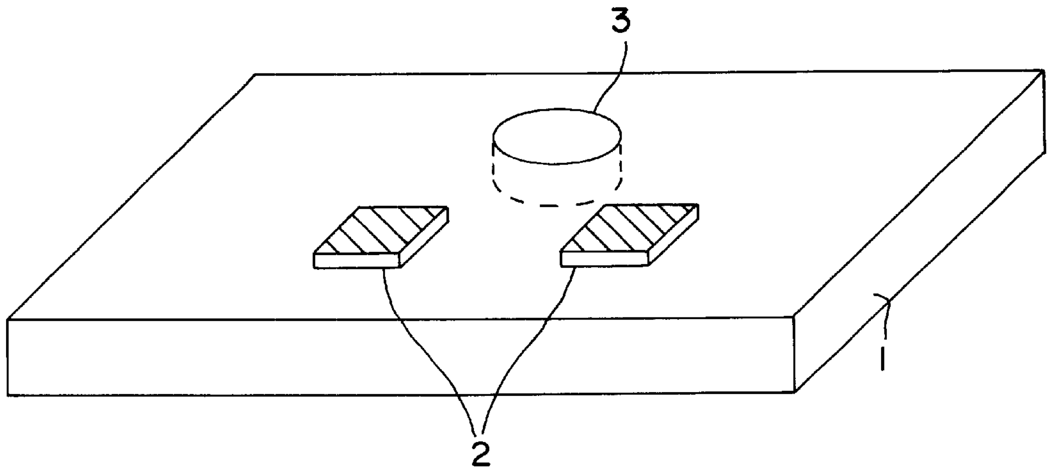
FIGS. 1 to 9 are schematic views for explaining production steps of a first embodiment of a process for the production of an ink jet head according to the present invention.

The present invention attains the above objects. That is, the present invention provides an improved process which enables one to effectively and efficiently produce a high quality ink jet head without the foregoing problems found in the prior art.

Particularly, the present invention lies in a process for producing an ink jet head including an ink pathway communicated with a discharging outlet and an energy generating element for generating energy utilized for discharging ink from said discharging outlet, said process comprising the steps of: (i) providing a substrate for an ink jet head which is provided with said energy generating element thereon, (ii) forming a photosensitive resin layer comprised of an ionizing radiation decomposable photosensitive resin containing a crosslinkable structural unit on said substrate so as to cover said energy generating element disposed on said substrate, (iii) subjecting said photosensitive resin layer to crosslinking treatment to convert said photosensitive resin layer into a crosslinked photosensitive resin layer, (iv) forming a coating resin layer on said crosslinked photosensitive resin layer, (v) hardening said coating resin layer, (vi) irradiating ionizing radiation to said crosslinked photosensitive resin layer through said hardened coating resin layer to decompose and solubilize said crosslinked photosensitive resin layer so as to contribute to the formation of said ink pathway, and (vi) eluting said crosslinked photosensitive resin layer irradiated with said ionizing radiation to thereby form said ink pathway communicated with the discharging outlet.

According to the process of the present invention, upon forming the coating resin layer, the photosensitive resin layer contributing to the formation of an ink pathway is in an insolubilized state and therefore, even if a solvent having a strong dissolving power is used in the coating process of forming the coating resin layer, the coating resin layer is efficiently formed while attaining a desired uniformity for the thickness of the coating resin layer, wherein a precise ink pathway with no deformation can be effectively formed, resulting in producing a high quality ink jet head at a high yield. The process of the prevent invention has further pronounced advantages in that there is no substantial limitation for the solvent used upon the formation of the coating resin layer by way of the coating process and this situation makes it possible to use resins, which could not have been used for the formation of the coating resin layer by way of the coating process in the prior art, for the formation of the coating resin layer.

The process for the production of an ink jet head according to the present invention will be described in more detail as follows.

Particularly, the process for the production of an ink jet head according to the present invention includes a first embodiment and a second embodiment which will be described below.

In the following, description will be made of each of the two embodiments.

First Embodiment

The first embodiment is directed to a process for the production of an ink jet head including an ink pathway communicated with a discharging outlet and an energy generating element for generating energy utilized for discharging ink from said discharging outlet, said process comprising the steps of: (a) providing a substrate for an ink jet head which is provided with said energy generating element thereon, (b) forming a photosensitive resin layer comprised of an ionizing radiation decomposable photosensitive resin containing a crosslinkable structural unit on said substrate so as to cover said energy generating element disposed on said substrate, (c) subjecting said photosensitive resin layer to crosslinking treatment to convert said photosensitive resin layer into a crosslinked photosensitive resin layer, (d) irradiating ionizing radiation to only a predetermined portion of the crosslinked photosenstive resin layer which does not contribute to the formation of an ink pathway to decompose and solubilize said predetermined portion, (e) removing said predetermined portion irradiated with said ionizing radiation by way of elution to form an ink pathway-forming pattern comprising the remaining crosslinked photosensitive resin layer not irradiated with said ionizing radiation, (f) forming a coating resin layer on said ink pathway-forming pattern so as to cover said ink pathway-forming pattern, (g) hardening said coating resin layer, (h) irradiating ionizing radiation to said ink pathway-forming pattern through said hardened coating resin layer to solubilize said ink pathway-forming pattern, and (i) removing said ink pathway-forming pattern by way of elution to thereby form said ink pathway communicated with the discharging outlet.

The process of the first embodiment will be detailed while referring to FIGS. 1 to 9. FIGS. 1 to 9 are schematic views for explaining production steps of the first embodiment. In FIGS. 1 to 9, there is described the production of an ink jet head having two discharging outlets (orifices). However, this is only for simplification purposes. It should be understood that the ink jet head includes ink jet heads having a number of discharging outlets and also an ink jet head having a discharging outlet.

FIG. 1 is a schematic view illustrating an example of a substrate for an ink jet head which is used for the production of an ink jet head. In FIG. 1, reference numeral 1 indicates a substrate for an ink jet head, reference numeral 2 an energy generating element capable of generating energy utilized for discharging ink, and reference numeral 3 an ink supply port.

In the process of the first embodiment, there is first provided a substrate 1 for an ink jet head.

The substrate 1 may be constituted by an appropriate material selected from the group consisting of silicon, glass, ceramics, plastics, metals and metal alloys. The substrate also serves not only as an ink pathway wall-forming member but also as a ink chamber wall-forming member. Other than this, the substrate further serves as a support for a photosensitive resin layer (which will be eventually removed) and a coating resin layer which will be later explained. There is no particular limitation for the shape of the substrate.

The substrate 1 is provided with a plurality of energy generating elements 2 which are spacedly arranged at an equal interval on the surface thereof. The energy generating element 2 may comprise an electrothermal converting element or piezo-electric element. In FIG. 1, there are shown only two energy generating elements, but this is only for purposes of simplification. In practice, a number of energy generating elements are usually arranged on the substrate 1. Each energy generating element serves to effect energy to ink in an ink pathway, resulting in discharging ink in a droplet from a discharging outlet, thereby providing a print on a printing medium such as a paper. Particularly, in the case where an electrothermal converting element is used as the energy generating element, the electrothermal converting element generates thermal energy to heat ink present in the vicinity thereof thereby causing a state change for the ink to form a bubble, wherein energy generated based on a pressure change caused upon the formation of the bubble acts as discharging energy to result in discharging ink in a droplet from a discharging outlet. In the case where a piezo-electric element is used as the energy generating element, energy caused by the mechanical vibration of the piezo-electric element acts as discharging energy to discharge ink in a droplet from a discharging outlet.

In any case, the energy generating element 2 includes a control signal inputting electrode electrically connected thereto (not shown).

The substrate 1 may contain a proper functional layer capable of improving the durability of the energy generating element 2 which is disposed thereon.

In addition, as shown in FIG. 1, the substrate 1 is provided with a ink supply port 3 comprising a through hole which is disposed at a position of the substrate where no energy generating element is present.

Figure 2:
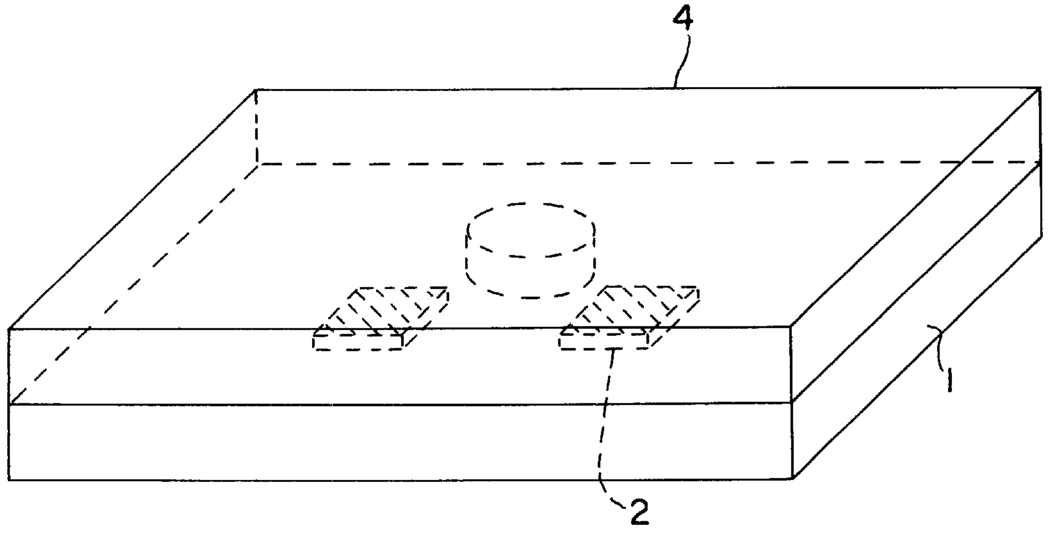

Then, as shown in FIG. 2, on the substrate 1 for an ink jet head, there is formed a photosensitive resin layer 4 composed of an ionizing radiation decomposable photosensitive resin containing a crosslinkable structural unit so as to cover the energy generating elements 2 disposed on the substrate. The ionizing radiation decomposable photosensitive resin means such a type that upon the irradiation of ionizing radiation (Deep-UV, electron rays, X-rays or the like), a high-molecular compound having a molecular weight of 10000 or more is converted into a low-molecular compound as a result of its intermolecular linkage having been broken. The ionizing radiation decomposable photosensitive resin retains film properties and a strength as a high-molecular compound unless it is irradiated with ionizing radiation, and because of this, the resin makes it possible to form a photosensitive resin film as the photosensitive resin layer 4 in a desirable state on the substrate 1.

The photosensitive resin layer 4 in the present invention is composed of a copolymerized high-molecular compound having an ionizing radiation decomposable structural unit and a crosslinkable structural unit in its molecular structure (that is, a photosensitive resin).

The ionizing radiation decomposable structural unit of the copolymerized high-molecular compound can include polyvinyl ketone series compounds represented by the following formula (I) and polymethacrylate series compounds represented by the following formula (II).

(I)

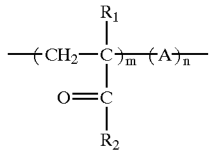

(wherein A is a structural unit capable of being crosslinked, $R_1$ is an alkyl group, $R_2$ is a group selected from the group consisting of alkyl groups, substituted and non-substituted aromatic rings, and heterocyclic rings, and m and n are respectively an integer.)

(II)

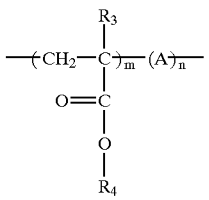

(wherein A is a structural unit capable of being crosslinked, $R_3$ is an alkyl group or halogen atom, $R_4$ is a group selected from the group consisting of alkyl groups, substituted and non-substituted aromatic rings, and heterocyclic rings, and m and n are respectively an integer.)

Specific examples of such polyvinyl ketone series high-molecular compound represented by the general formula (I) are polymethyl isopropenyl ketone, polyphenyl isopropynyl ketone, polymethylvinyl ketone, polyphenylvinyl ketone, and polyisopenyl-t-butyl ketone. Specific examples of such polymethacrylate series high-molecular compound represented by the general formula (II) are polymethacrylate, poly-n-butyl methacrylate, poly-t-butyl methacrylate, polyphenyl methacrylate, polyhexafluorobutyl methacrylate, and polymethacrylic acid.

The above described copolymerized high-molecular compound comprises a copolymer in which the aforesaid ionizing radiation decomposable structural unit is copolymerized with a given crosslinkable structural unit.

The crosslinkable structural unit can include reactive groups such as epoxy group, carboxylic acid group, carboxylic acid chloride group, hydroxyl group, and unsaturated double bond group and compounds having these reactive groups. Specific examples are glycidyl methacrylate, methacrylic acid, and methacrylic acid chloride. These reactive functional groups may be intermolecularly crosslinked by way of directly linking with each other by the irradiation of heat or ionizing radiation. Alternatively, they may be intermolecularly crosslinked using a proper crosslinking agent (or a proper hardener). In the case of causing the crosslinking reaction by the irradiation of ionizing radiation, it is possible to use a proper sensitizing agent (such as a radical polymerization initiator, cation polymerization initiator or the like).

The copolymerization ratio between the decomposable structural unit and the crosslinkable structural unit in the photosensitive resin (the copolymerized high-molecular compound) should be properly determined depending on the situation. However, in general, the molar ratio of the crosslinkable structural unit is made to be 30 mole % or less versus the copolymer. In this case, there can be sufficiently attained a desirable resistance to solvents and a desirable heat resistance. In the case where the crosslinkable structural unit is excessive, there is a tendency that the decomposition rate upon the irradiation of ionizing radiation is decreased.

In the following, there are shown certain copolymers as examples of the photosensitive resin containing the crosslinkable structural unit and the ionizing radiation decomposable structural unit, but these are only for illustrative purposes and are not restrictive.

(1)

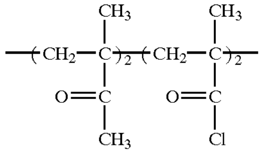

(2)

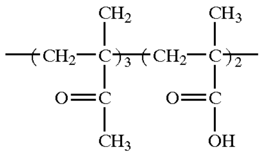

(3)

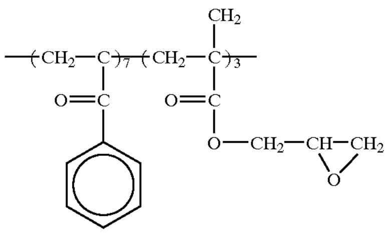

(4)

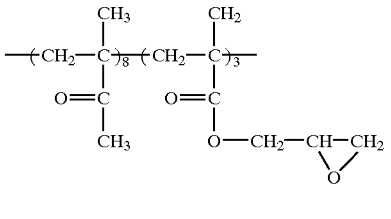

-continued (5)

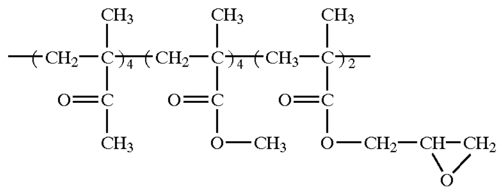

(6)

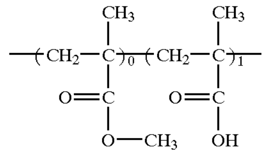

(7)

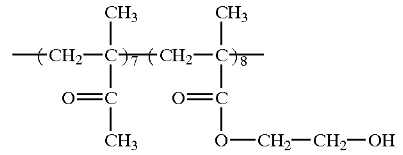

(8)

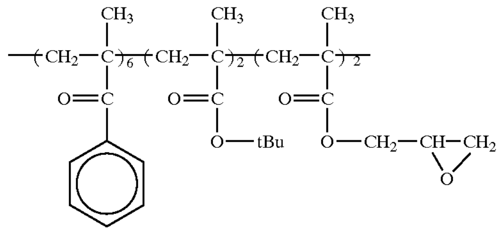

In the present embodiment, it is desired for the photosensitive resin layer to be composed of any of the foregoing polyvinyl ketone series compounds. The polyvinyl ketone series compounds are generally high in rate of decomposition reaction (or sensitivity) against ionizing radiation and therefore, the removal of the photosensitive resin layer by way of elution can be quickly carried out.

The formation of the photosensitive resin layer 4 may be conducted by a manner of providing a solution comprising a given ionizing radiation decomposable photosensitive resin dissolved in a given solvent, applying the solution onto a proper film such as a PET film to form a liquid coat on the film, converting the liquid coat on the film into a dry film, and transferring the dry film onto the substrate 1 for an ink jet head by using a laminator.

Alternatively, the formation of the photosensitive resin layer 4 may be conducted by means of the solvent-coating process such as spin coating process or roll coating process.

The photosensitive resin layer 4 thus formed is crosslinked by heating it or irradiating ionizing radiation thereto. In the case where the photosensitive resin layer is crosslinked by the irradiation of ionizing radiation, it is a matter of course that ionizing radiation having a wavelength by which the photosensitive resin layer itself is decomposed is not used.

The photosensitive resin layer thus crosslinked is substantially insoluble in organic solvents.

Figure 3:
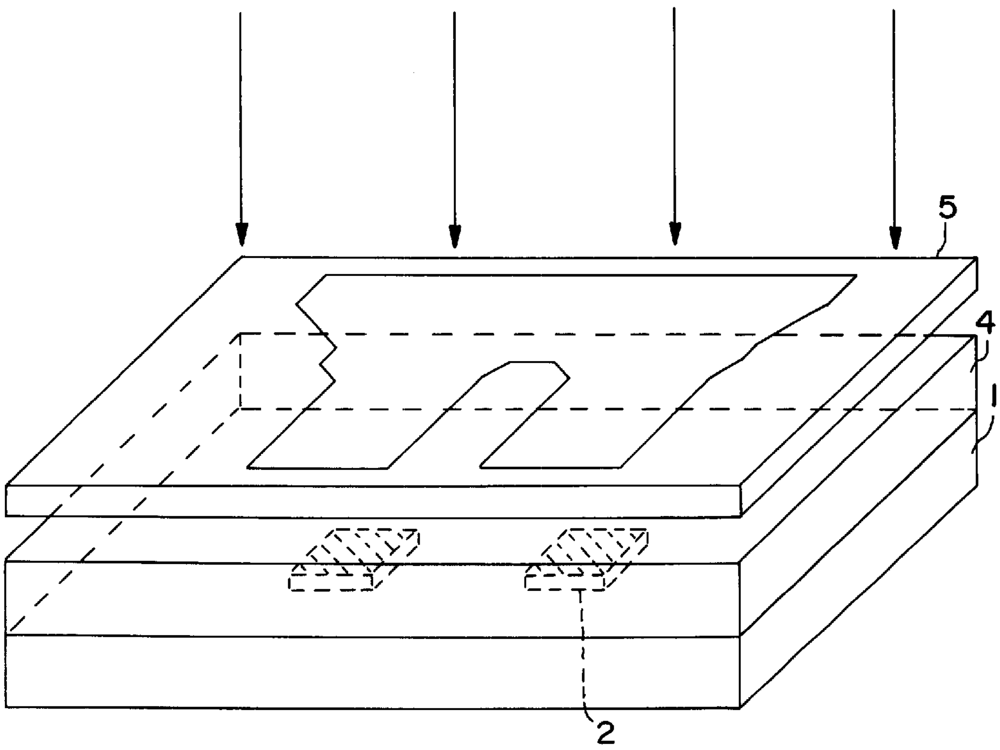
Figure 4:
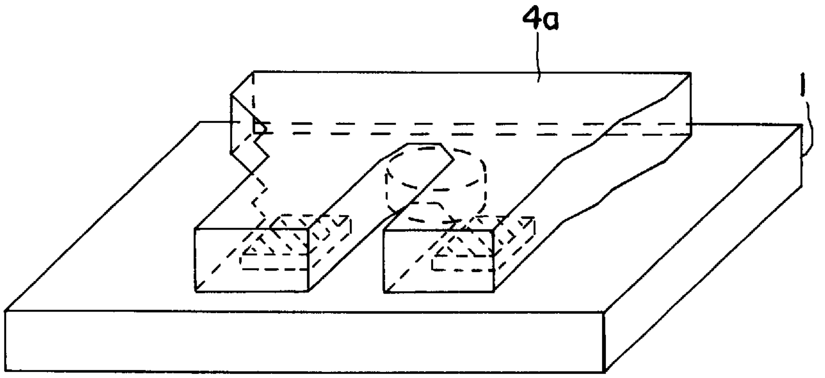

Then, as shown in FIG. 3, a patterning mask 5 is superposed on the surface of the crosslinked photosensitive resin layer 4, and ionizing radiation is irradiated to a predetermined portion of the crosslinked photosensitive layer which does not contribute to the formation of an ink pathway to solubilize said predetermined portion, followed by eluting with the use of a solvent to remove the predetermined portion, thereby forming a ink pathway-forming pattern 4*a* as shown in FIG. 4. The ink pathway-forming pattern 4*a* is comprised of the non-solubilized crosslinked photosensitive resin. The ink pathway-forming pattern 4*a* contributes to the formation of an ink pathway provided with the ink supply port 3 and energy generating elements 2.

In the present invention, it is possible that the non-crosslinked photosensitive resin layer 4 is subjected to patterning in the above described manner to form the ink pathway-forming pattern 4*a* and thereafter, the ink pathway-forming pattern is crosslinked. In this case, due care should be taken so that the ink pathway-forming pattern is not deformed.

Figure 5:
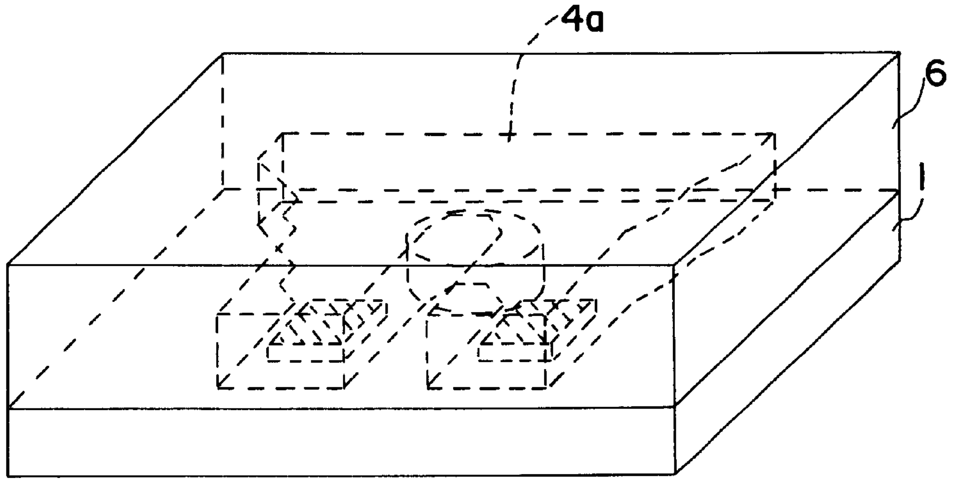

After the formation of the ink pathway-forming pattern 4*a*, as shown in FIG. 5, there is formed a coating resin layer 6 on the ink pathway-forming pattern so as to cover the ink pathway-forming pattern. The coating resin layer 6 serves as a structural member of an ink jet head and therefore, the coating resin layer is required to have a sufficient mechanical strength, heat resistance, adhesion property to the substrate 1 for an ink jet head, and resistance to ink. As the constituent material of the coating resin layer which satisfies these requirements, there can be mentioned hardening resins such as epoxy resin, acrylic resin, diglycol dialkylcarbonate resin, unsaturated polyester resin, diarylphthalate resin, polyurethane resin, polyimide resin, melamine resin, phenol resin, and urea resin. These hardening resins are used together with a conventional hardening agent upon forming the coating resin layer. If necessary, it is possible to use light or thermal energy in order to harden any of these hardening resins by which the coating resin layer is constituted.

The formation of the coating resin layer 6 may be conducted by a manner of providing a solution comprising any of the above hardening resins dissolved in a given solvent and applying the solution onto the ink pathway-forming pattern 4*a* by the solvent-coating process or another manner of heat-fusing any of the above hardening resins to obtain a fused resin and applying the fused resin onto the ink pathway-forming pattern by way of transfer molding. Herein, as above described, the ink pathway-forming pattern 4*a* is constituted by the crosslinked ionizing radiation decomposable photosensitive resin in a state of being substantially insoluble in organic solvents and because of this, the ink pathway-forming pattern is never dissolved in the organic solvent used upon forming the coating resin layer by the solvent-coating process. Hence, the ink pathway-forming pattern is never dissolved into the constituent material of the coating resin layer. Therefore, the interface between the ink pathway-forming pattern 4*a* and the coating resin layer 6 is always maintained in a desirable state without suffering from a negative influence. This situation provides pronounced advantages in that no substantial limitation is present as for the solvent used upon forming the coating resin layer by the solvent-coating process and therefore, any solvent, even if it is a solvent having a strong dissolving power, can be used for the formation of the coating resin layer, and because of this, it is possible to use resins, which could not have been used for the formation of the coating resin layer by the solvent-coating process in the prior art, for the formation of the coating resin layer. Particularly, as for the constituent resin of the coating resin layer, an optimum resin can be selectively used.

After the formation of the coating resin layer 6, discharging outlets are formed at the coating resin layer by way of dry etching using oxygen plasma.

The formation of the discharging outlets at the coating resin layer may be conducted, for example, in the following manner.

Figure 6:
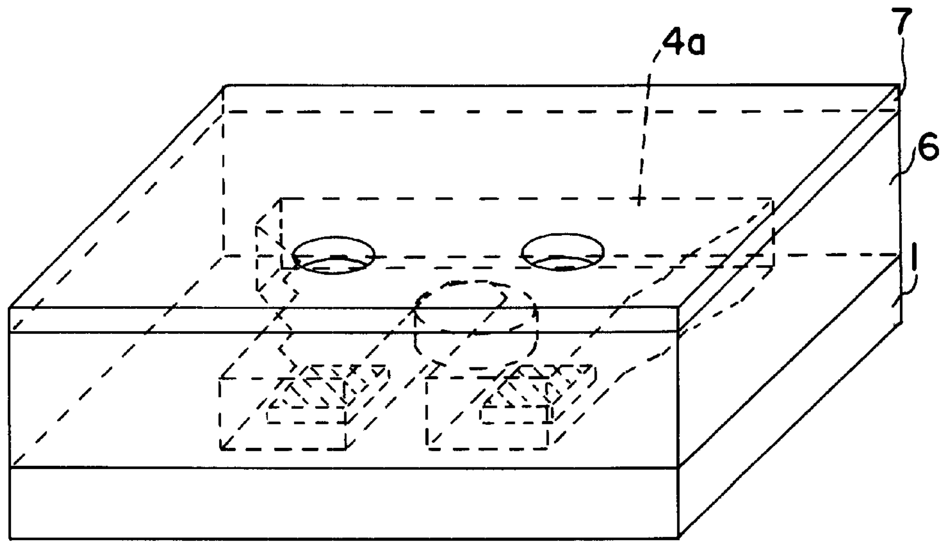

That is, as shown in FIG. 6, a silicon series resist 7 capable of being a discharging outlet-forming patterning mask is superposed on the coating resin layer 6, followed by subjecting to photolithography to form a discharging outlet-forming pattern. As the silicon series resist 7, there can be used any silicon series resist as long as it has a sufficient resistance to the dry etching using oxygen plasma. Specific examples of such silicone series resist are chloromethyl polydiphenyl siloxane (trademark name: Toyobeam SNR, produced by Toso Kabushiki Kaisha), polydimethyl siloxane, polyphenyl silcesquioxane, and silicon-containing polymethacryl resin. These silicon series resists are of the ionizing radiation functional type and they are sensitized by Deep-UV rays and electron rays. Other than these silicon series resists, UV ray-functional type resists which have been recently developed are also usable.

Figure 7:
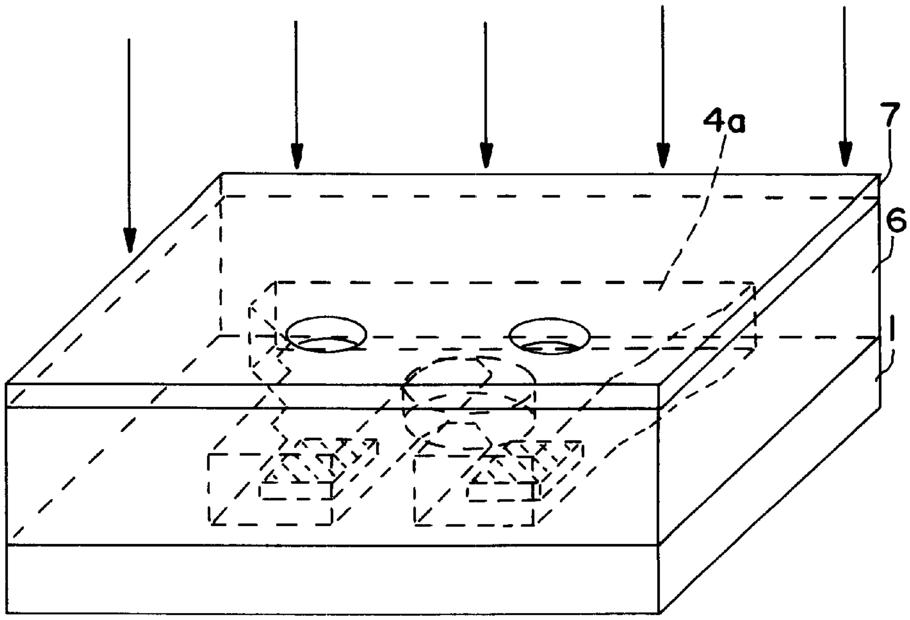

Successively, as shown in FIG. 7, the coating resin layer 6 is subjected to dry etching by applying oxygen plasma to the coating resin layer through the silicon series resist 7 to form discharging outlets 9. The dry etching using oxygen plasma is desired to be conducted by using an anisotropic etching apparatus such as a reactive etching apparatus or a magnetron ion etching apparatus. As for the etching condition, it is necessary to optimize the oxygen gas pressure and the electric power applied in order to make the anisotropic etching possible. Since the silicon series resist 7 is hardly etched in the etching operation, it is possible to form the discharging outlets at a high precision. The etching end point may be set at the stage where the etching reaches the ink pathway-forming pattern 4*a*. There is no need for a precise detection of the etching end point.

Figure 18:
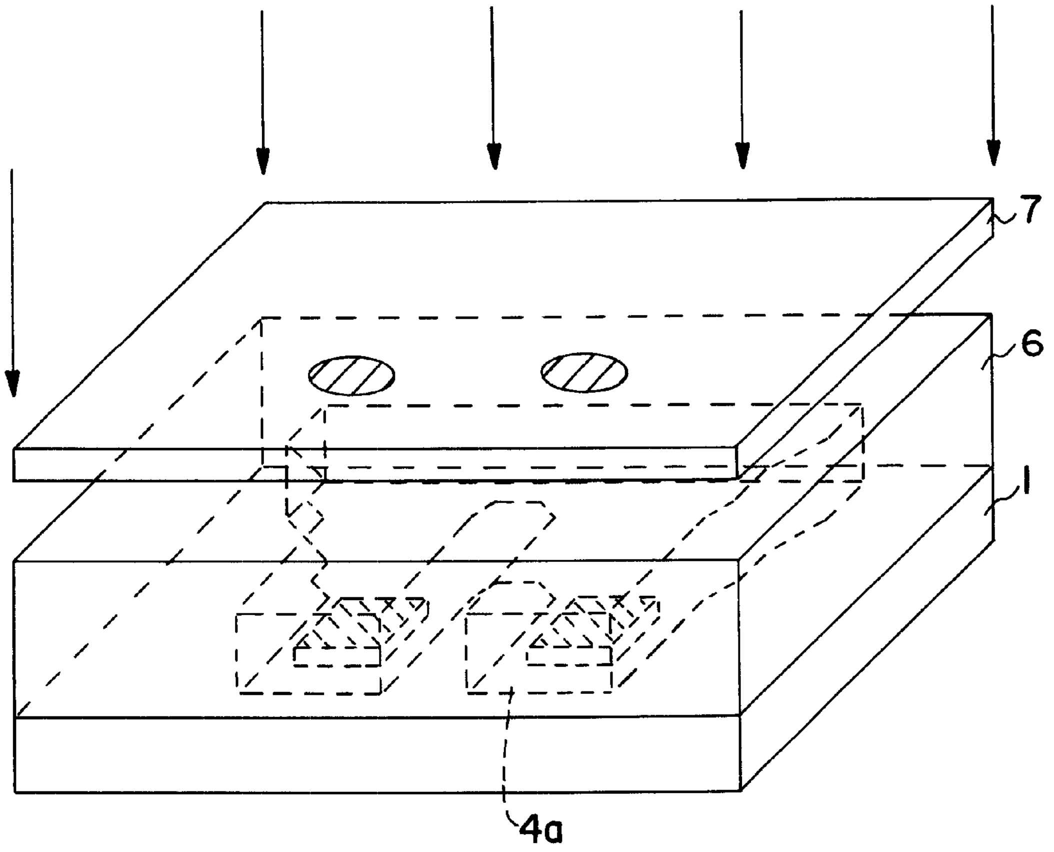
FIG. 18 is a schematic view for explaining a step of forming a discharging outlet by way of photolithography in the present invention.

Other than the above described dry etching manner using oxygen plasma, the formation of the discharging outlets at the coating resin layer may be conducted by a manner of superposing a mask having a discharging outlet-forming pattern on the coating resin layer, followed by subjecting to irradiation of excimer laser or another manner of constituting the coating resin layer by a photosensitive resin, followed by subjecting the coating resin layer to photolithography as shown in FIG. 18.

In the case where the discharging outlets have been formed using oxygen plasma or excimer laser, it is necessary to harden the coating resin layer.

Figure 8:
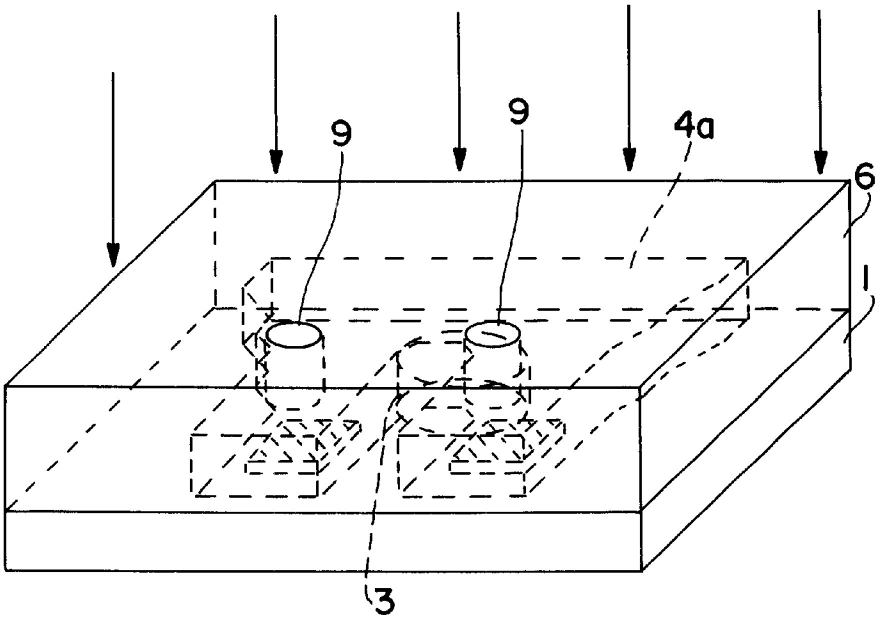

After the formation of the discharging outlets at the coating resin layer 6, as shown in FIG. 8, ionizing radiation is irradiated to the ink pathway-forming pattern 4*a* through the coating resin layer 6 to solubilize the ink pathway-forming pattern.

Figure 9:
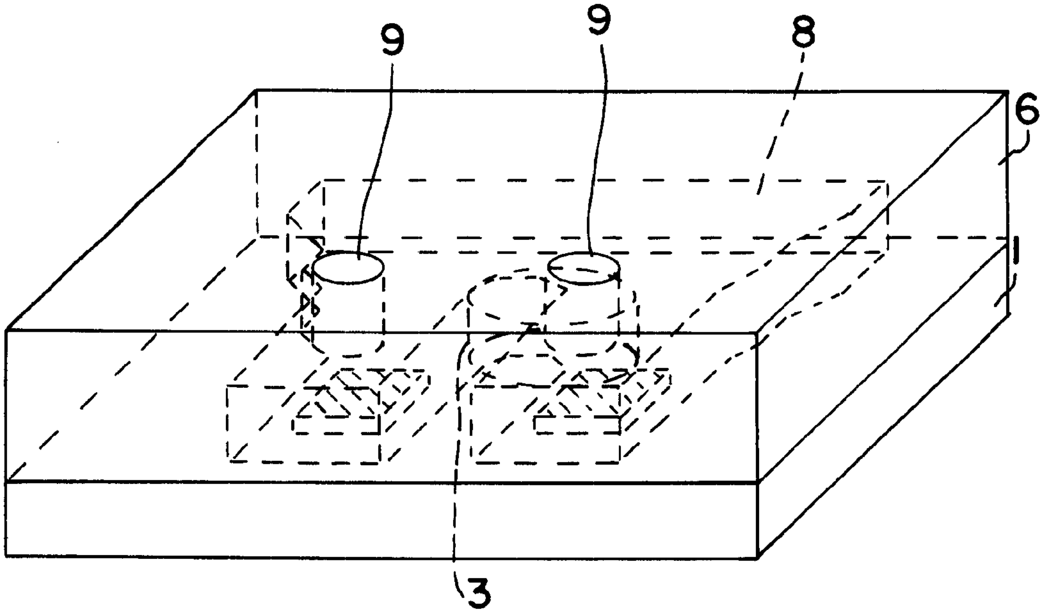

Finally, the solubilized ink pathway-forming pattern 4*a* is eluted with the use of a solvent to remove it, thereby forming a ink pathway 8 (see, FIG. 9). Thus, there is obtained an ink jet head.

In the above, description has been made of the case of producing the side shooter type ink jet head. However, it is a matter of course that the present invention can be employed also for the production of an ink jet head of the edge shooter type of discharging ink in the direction along the face on which energy generating elements are arranged. In the case where the present invention is employed for the production of the edge shooter type ink jet head, discharging outlets are formed at an end portion of the substrate for an ink jet head having the coating resin layer formed thereon and therefore, the above discharging outlet-forming step is not necessary to be conducted.

Second Embodiment

The second embodiment is different from the first embodiment with a point that in the first embodiment, before the formation of the coating resin layer, the photosensitive resin layer is patterned to have the ink pathway-forming pattern; but in the second embodiment, after forming the coating resin layer on the photosensitive resin layer, the photosensitive resin layer is patterned to have an ink pathway-forming pattern.

Particularly, the second embodiment is directed to a process for the production of an ink jet head including an ink pathway communicated with a discharging outlet and an energy generating element for generating energy utilized for discharging ink from said discharging outlet, said process comprising the steps of: (a) providing a substrate for an ink jet head which is provided with said energy generating element thereon, (b) forming a photosensitive resin layer comprised of an ionizing radiation decomposable photosensitive resin containing a crosslinkable structural unit on said substrate so as to cover said energy generating element disposed on said substrate, (c) subjecting said photosensitive resin layer to crosslinking treatment to convert said photosensitive resin layer into a crosslinked photosensitive resin layer, (d) forming a coating resin layer on said crosslinked photosensitive resin layer to cover said crosslinked photosensitive resin layer, (e) hardening said coating resin layer, (f) irradiating ionizing radiation to only a predetermined portion of the crosslinked photosenstive resin layer which contributes to the formation of an ink pathway to decompose and solubilize said predetermined portion through said coating resin layer, (g) removing said predetermined portion irradiated with said ionizing radiation by way of elution to form said ink pathway communicated with the discharging outlet.

The process of the second embodiment will be detailed while referring to FIGS. 10 to 17. Herein, explanations of the parts which already have been explained in the first embodiment are omitted.

FIGS. 10 to 17 are schematic views for explaining production steps of the second embodiment. In FIGS. 10 to 17, there is described the production of an ink jet head having two discharging outlets (orifices). However, this is only for simplification purposes. It should be understood that the ink jet head includes ink jet heads having a number of discharging outlets and also an ink jet head having a discharging outlet.

Figure 10:
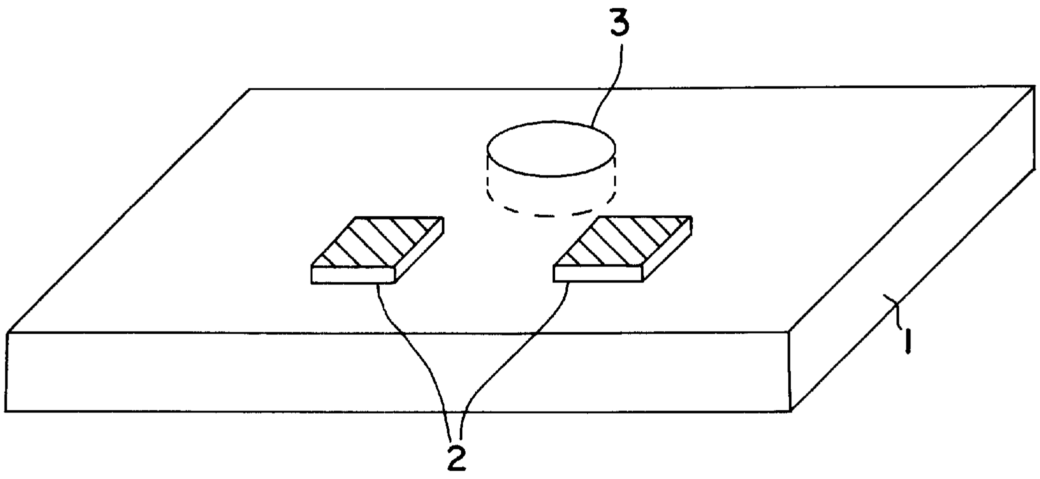
FIGS. 10 to 17 are schematic views for explaining production steps of a second embodiment of a process for the production of an ink jet head according to the present invention.

In the process of the second embodiment, there is first provided a substrate 1 for an ink jet head which is provided with energy generating elements 2 and an ink supply port 3, which is shown in FIG. 10.

Figure 11:
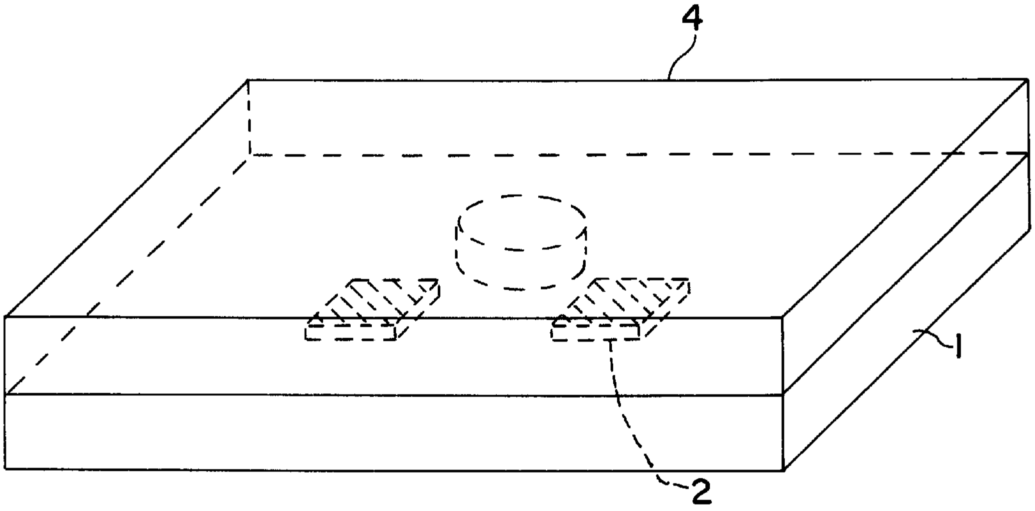

Then, as shown in FIG. 11, on the substrate 1 for an ink jet head, there is formed a photosensitive resin layer 4 composed of an ionizing radiation decomposable photosensitive resin containing a crosslinkable structural unit so as to cover the energy generating elements 2 disposed on the substrate.

In the present embodiment, the photosensitive resin layer 4 serves as a partial constituent member of an ink pathway to be formed. Therefore, it is desired that of the high-molecular compounds described in the formation of the photosensitive resin layer in the first embodiment, polymethacrylate series high-molecular compounds which excel in film strength are selectively used for the formation of the photosensitive resin layer in the present embodiment.

The formation of the photosensitive resin layer 4 using such polymethacrylate series high-molecular compound may be conducted by any of the manners described in the formation of the photosensitive resin layer in the first embodiment.

The photosensitive resin layer 4 thus formed is crosslinked by heating it or irradiating ionizing radiation thereto. In the case where the photosensitive resin layer is crosslinked by the irradiation of ionizing radiation, it is a matter of course that ionizing radiation having a wavelength by which the photosensitive resin layer itself is decomposed is not used.

The photosensitive resin layer thus crosslinked is substantially insoluble in organic solvents.

Figure 12:
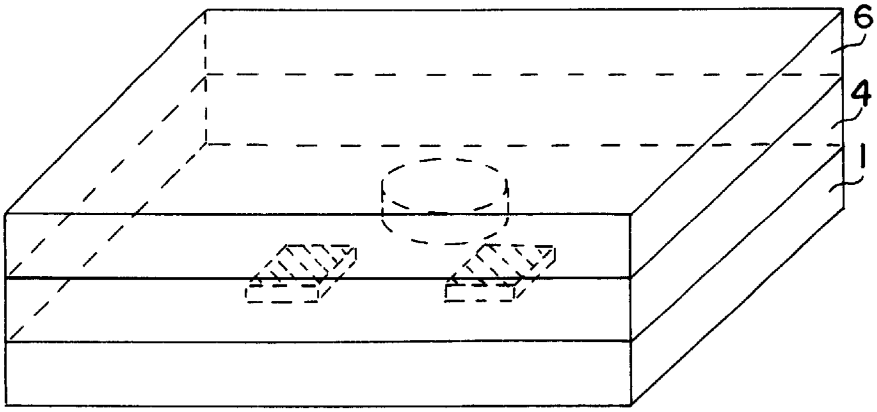

After the formation of the crosslinked photosensitive resin layer, as shown in FIG. 12, there is formed a coating resin layer 6 on the crosslinked photosensitive resin layer so as to cover the crosslinked photosensitive resin layer. The coating resin layer 6 serves as a structural member of an ink jet head and therefore, the coating resin layer is required to have a sufficient mechanical strength, heat resistance, adhesion property to the substrate 1 for an ink jet head, and resistance to ink. As the constituent material of the coating resin layer, any of the hardening resins described in the formation of the coating resin layer in the first embodiment may be used.

The formation of the coating resin layer 6 may be conducted by any of the manners described in the formation of the coating resin layer in the first embodiment.

Herein, as above described, the photosensitive resin layer 4 is constituted by the crosslinked ionizing radiation decomposable photosensitive resin in a state of being substantially insoluble in organic solvents and because of this, the photosensitive resin layer is never dissolved in the organic solvent used upon forming the coating resin layer by the solvent-coating process. Hence, the photosensitive resin layer is never dissolved into the constituent material of the coating resin layer. Therefore, the interface between the photosensitive resin layer 4 and the coating resin layer 6 is always maintained in a desirable state without suffering from a negative influence. This situation provides pronounced advantages in that no substantial limitation is present as for the solvent used upon forming the coating resin layer by the solvent-coating process and therefore, any solvent, even if it is a solvent having a strong dissolving power, can be used for the formation of the coating resin layer, and because of this, it is possible to use resins, which could not have been used for the formation of the coating resin layer by the solvent-coating process in the prior art, for the formation of the coating resin layer. Particularly, as for the constituent resin of the coating resin layer, it is not required to have a high resolution property and therefore, an optimum resin can be selectively used.

Figure 13:
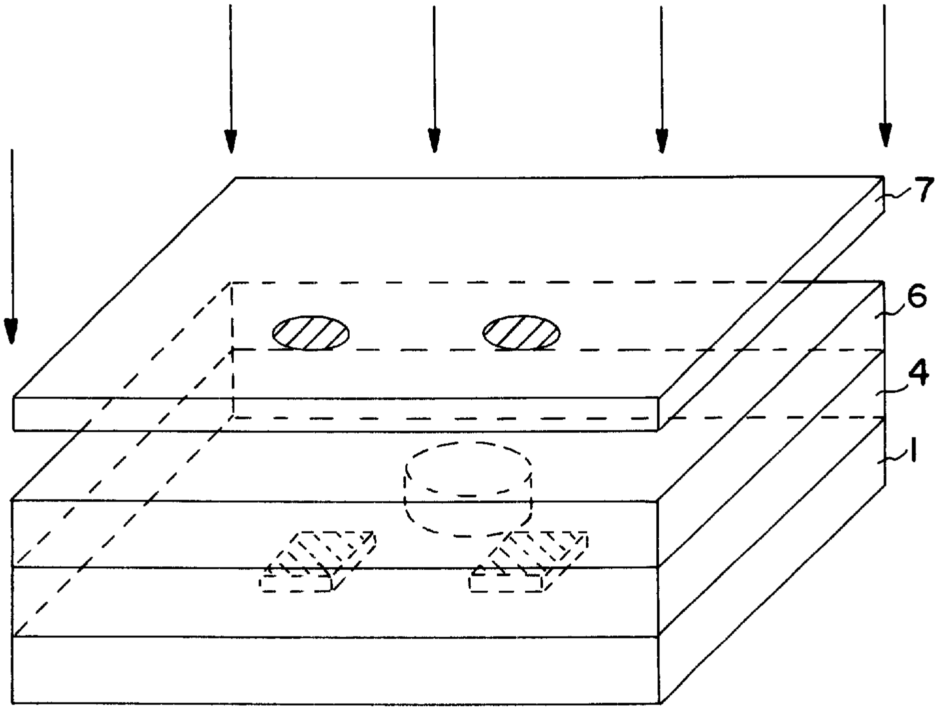
Figure 14:
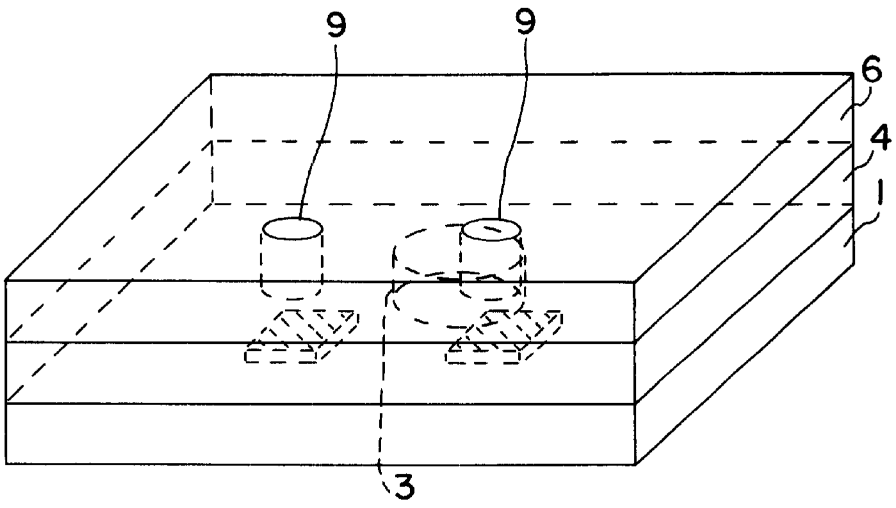

After the formation of the coating resin layer 6, discharging outlets 9 (see, FIG. 14) are formed at the coating resin layer. The formation of the discharging outlets may be conducted by a photolithography process. The formation of the discharging outlets by the photolithography process may be conducted, for instance, in the following manner. That is, in the case of forming the discharging outlets at the coating resin layer by the photolithography process, the coating resin layer is constituted by a hardening resin having a negative photosensitive property. Then, as shown in FIG. 13, the coating resin layer 6 is subjected to light exposure through a discharging outlet-forming patterning mask 7 having shielding portions for forming discharging outlets. By this, the coating resin layer is hardened except for its shielded portions to form a discharging outlet-forming pattern at the coating resin layer, wherein the discharging outlet-forming pattern comprises non-hardened portions based on the shielded portions and the remaining portion of the coating resin layer is hardened. Thereafter, as shown in FIG. 14, the non-hardened portions are removed by eluting them with the use of a solvent, thereby forming discharging outlets 9 at the coating resin layer 6.

Figure 15:
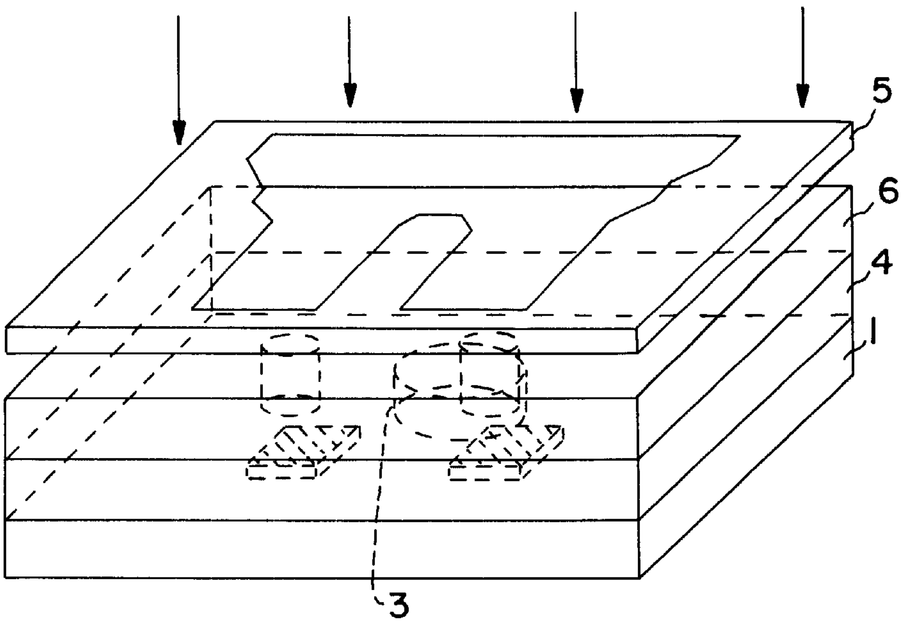

After the formation of the discharging outlets at the coating resin layer, ionizing radiation is irradiated to a predetermined portion of the photosensitive resin layer 4 which contributes to the formation of an ink pathway through the hardened coating resin layer to solubilize said predetermined portion. Particularly, as shown in FIG. 15, using a ink pathway-forming patterning mask 5, ionizing radiation is irradiated to the photosensitive resin layer through the hardened coating resin layer to form a solubilized ink pathway-forming pattern 4*a* (see, FIG. 16) at the photosensitive resin layer.

Figure 16:
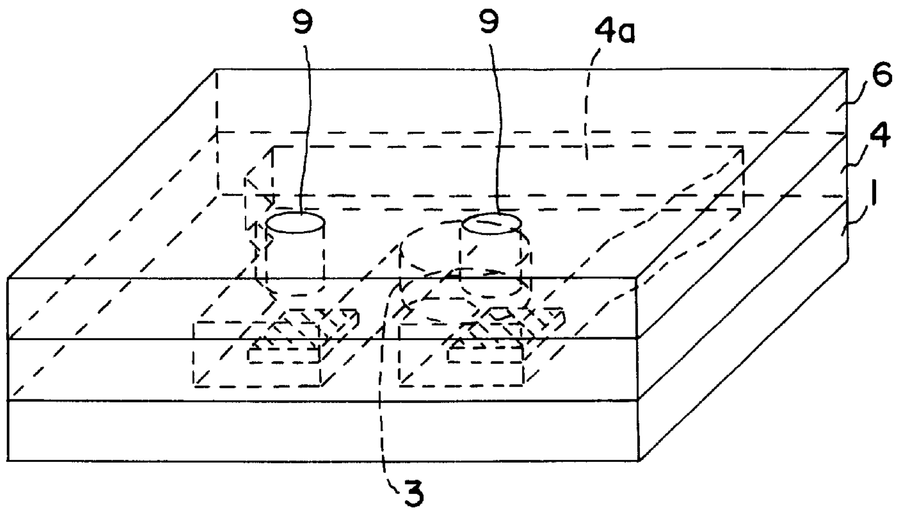
Figure 17:
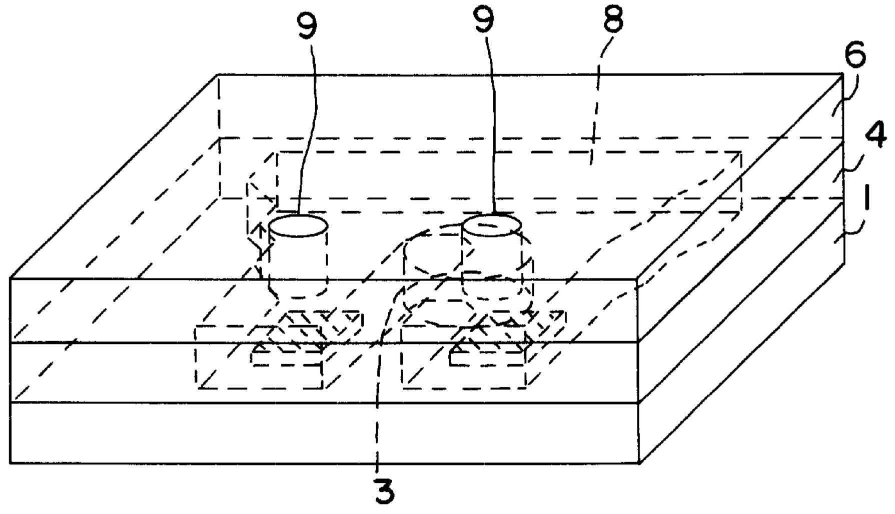

Finally, as shown in FIG. 16, the solubilized ink pathway-forming pattern 4*a* is removed by eluting it with the use of a solvent, thereby forming an ink pathway 8 provided with discharging outlets 9. Thus, there is obtained an ink jet head (see, FIG. 17).

As above described, in the present embodiment, the formation of the discharging outlets is conducted before the solubilization of the ink pathway-forming portion of the photosensitive resin layer 4. This is due to the fact that since the coating resin layer is constituted by the negative type photosensitive resin, if the irradiation of ionizing radiation to the ink pathway-forming portion of the photosensitive layer 4 should be conducted in advance of the formation of the discharging outlets, the discharging outlet-forming portions of the coating resin layer 6 are hardened so that no discharging outlet can be formed.

In the present embodiment, the formation of the discharging outlets may be conducted by the dry etching process using oxygen plasma which is described in the first embodiment. In this case, the formation of the discharging outlets by the dry etching process using oxygen plasma is desired to be conducted before the solubilization of the ink pathway-forming portion of the photosensitive layer 4, because if the dry etching process should be conducted under conditions that the ink pathway-forming portion of the photosensitive resin layer 4 is in a solubilized state, a problem is liable to occur in that gas is generated from said solubilized portion of the photosensitive resin layer 4 to result in damaging the shape of an ink pathway to be provided.

Further, in the present embodiment, the substrate for an ink jet head has a substantially flat surface upon forming the coating resin layer by the solvent-coating process, and there can be easily attained a flat surface for the coating resin layer formed. This situation provides an advantage in that the distance between the discharging outlet 9 and the energy generating element 2 can be precisely controlled.

In the following, description will be made of an ink jet apparatus (IJA) in which an ink jet head obtained according to the present invention can be used as an ink jet cartridge (IJC).

Figure 32:
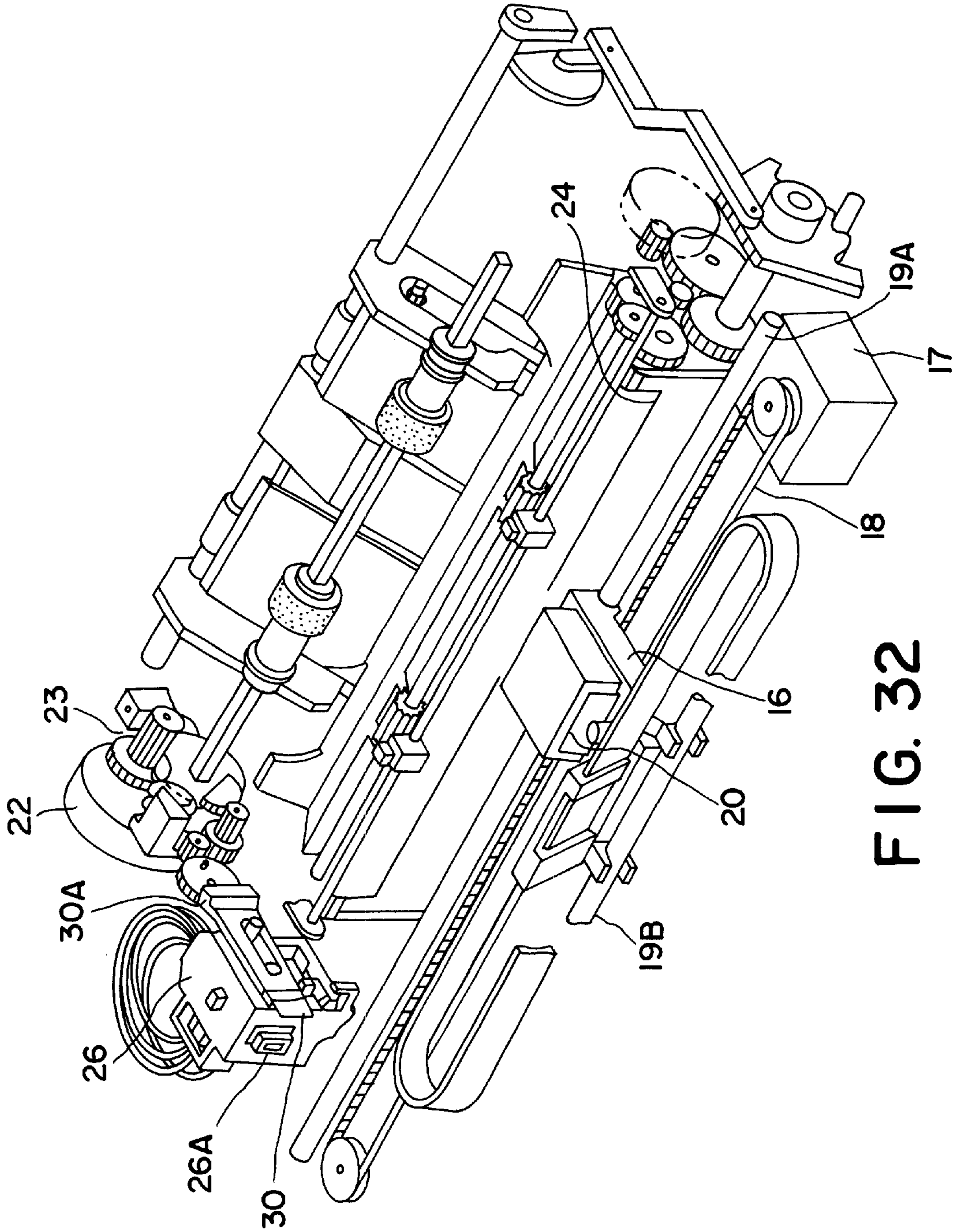
FIG. 32 is a schematic diagram illustrating an ink jet apparatus in which an ink jet head obtained according to the present invention can be used.

FIG. 32 is a schematic diagram illustrating an example of such ink jet apparatus (IJA). In FIG. 32, reference numeral 20 indicates an ink jet cartridge (IJC) provided with the nozzle group which discharges ink onto the printing surface of a printing sheet fed on a platen 24, reference numeral 16 a cartridge HC to hold the IJC 20, which is partly coupled to a driving belt 18 for transmitting the driving force of a driving motor 17, and slidably mounted on two guide shafts 19A and 19B arranged in parallel to each other, thus enabling the IJC 20 to reciprocate along the entire width of the printing sheet.

Reference numeral 26 indicates a head recovery device which is arranged at one end of the traveling passage of the IJC, that is, a location opposite to its home position, for example. The head recovery device 26 is driven by the driving force of a motor 22 through a transmission mechanism 23 in order to cap the IJC 20. Interlocked with the capping operation for the IJC 20 by a cap unit 26A of the head recovery device 26, an ink suction is conducted by an appropriate suction means provided in the head recovery device 26 or the pressurized ink feeding is conducted by an appropriate pressure means provided in the ink supply passage to the IJC 20. When the printing operation is terminated, the capping is conducted to protect the IJC 20.

Reference numeral 30 indicates a wiping blade made of silicone rubber, which is arranged at the side end of the head recovery device 26. The blade 30 is held by a blade holding member 30A in a cantilever fashion, and is driven by the motor 20 and the transmission mechanism 23 in the same manner as in the head recovery device 26, hence enabling it to engage with the discharging face of the IJC 20. In this way, the blade 30 is allowed to extrude in the traveling passage of the IJC 20 at an appropriate timing during the printing operation of the IJC 20 or subsequent to the discharge recovery process using the head recovery device 26 in order to wipe condensation, moisture, or dust particles on the discharging face of the IJC 20 along the traveling of the IJC 20.

In the following, the present invention will be described in more detail with reference to the following examples 1 to 7, which are only for illustrative purposes and not intended to restrict the scope of the present invention.

The following examples 1 to 4 and 7 belong to the first embodiment of the present invention and the following examples 5 and 6 belong to the second embodiment of the present invention.

EXAMPLE 1

Figure 19:
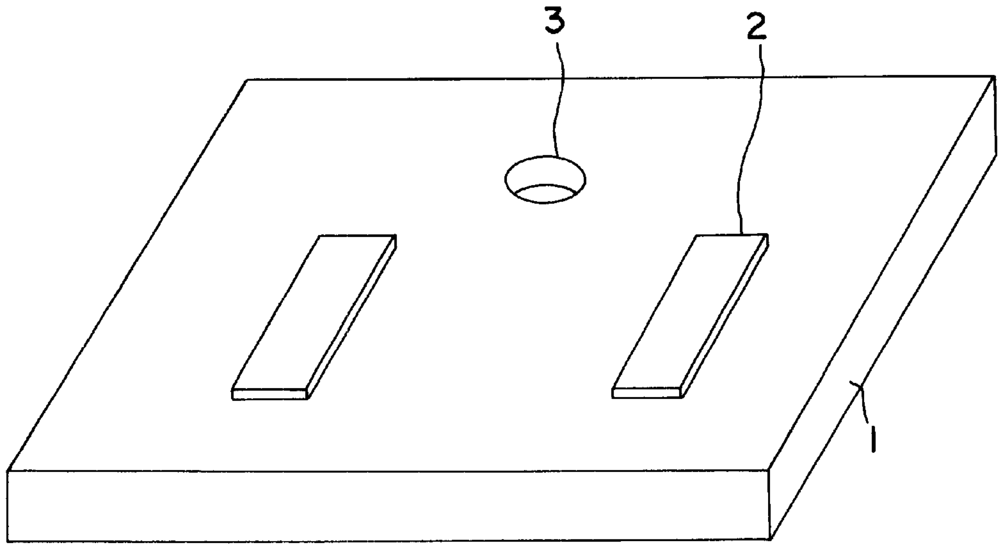
FIGS. 19 to 25 are schematic views for explaining production steps of producing an ink jet head in Examples 1 to 4 belonging to the first embodiment of the present invention, which will be later described.

At first, there was provided a substrate 1 made of silicon for an ink jet head which is provided with energy generating elements 2 each comprising an electrothermal converting element (comprised of $HfB_2$) capable of generating energy utilized for discharging ink (see, FIG. 19). Then, an ink supply port 3 was formed at the substrate 1 using a YAG laser (see, FIG. 19).

Separately, there was prepared a dry film by applying a coating liquid comprising a cyclohexanone solution containing 15 wt. % of a copolymer of methylisopropenyl ketone and methacrylic acid chloride (copolymerization ratio: 85/15, weight average molecular weight: about 200000) onto a PET film and subjecting the liquid coat formed on the PET film to drying.

Figure 20:
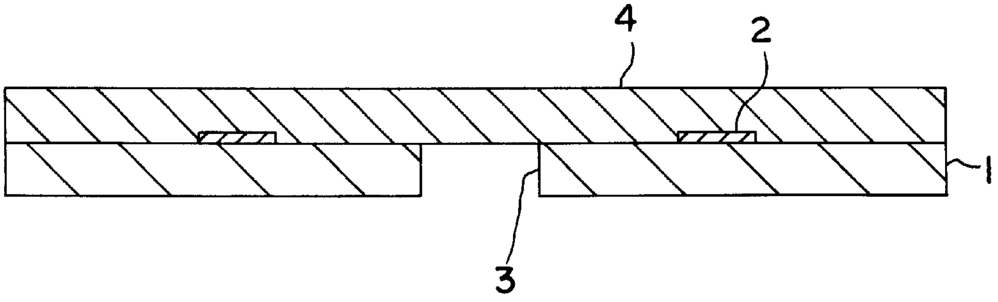

Then, as shown in FIG. 20, the dry film thus formed on the PET film was transferred onto the substrate 1 by means of a laminator at 130° C., to thereby form an ionizing radiation decomposable photosensitive resin layer 4 on the substrate so as to cover the energy generating elements 2 situated on the substrate. The photosensitive resin layer 4 was then baked at 150° C. for an hour to crosslink the photosensitive resin layer 4.

Figure 21:
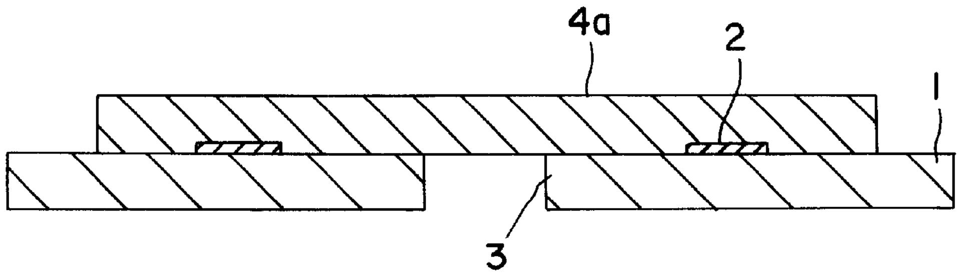

Successively, using a mask aligner PLA-520FA produced by Canon Kabushiki Kaisha (using cold mirror-CM-290), ionizing radiation was irradiated to only a predetermined portion of the crosslinked photosensitive resin layer, which does not contribute to the formation of an ink pathway, for 2 minutes, thereby said predetermined portion was solubilized. Thereafter, the solubilized portion of the photosensitive resin layer 4 was eluted with the use of methylisobutyl ketone to remove the solubilized portion, followed by rinsing with xylene, thereby forming an ink pathway-forming pattern 4*a* comprised of the remaining crosslinked photosensitive resin layer (in a non-solubilized state) (see, FIG. 21).

Herein, the ink pathway-forming pattern 4*a* contributes to the formation of an ink pathway which communicates with the ink supply port 3 and contains the energy generating elements 2 therein. Thus, the ink pathway-forming pattern is left on the location where the ink pathway is provided.

The thickness of the resultant ink pathway-forming pattern 4*a* was found to be 11 $\mu$m.

Figure 22:
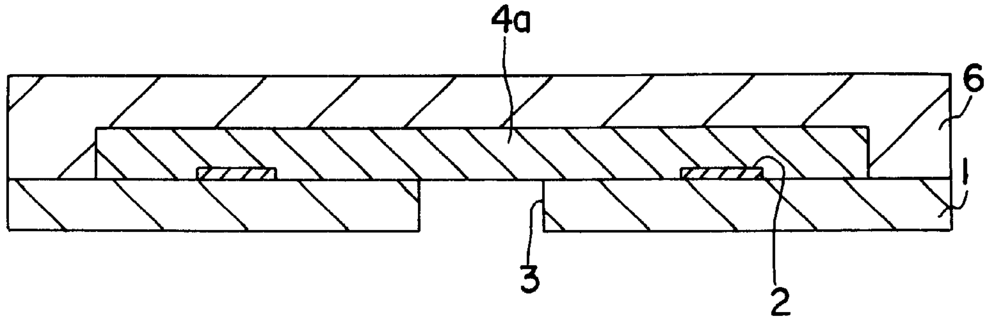

Then, as shown in FIG. 22, a mixture of a copolymer of methylmethacrylate and glycidyl methacrylate (copolymerization ratio: 1/4, weight average molecular weight: about 200000 (in terms of the polystyrene)) and diethylenetetramine (equivalent to an amount of active amine (—NH) to the epoxy group in said copolymer) was dissolved in cyclohexanone to obtain a cyclohexanone solution containing 21 wt. % of said mixture. The resultant solution was applied onto the substrate 1 so as to cover the ink pathway-forming pattern 4*a* using a spinner, followed by subjecting to hardening treatment at 100° C. for 2 hours, whereby a 10 $\mu$m thick resin film as a coating resin layer 6 was formed on the substrate 1 so as to cover the ink pathway-forming pattern 4*a*. In this process of forming the coating resin layer 6, no deformation occurred at the ink pathway-forming pattern 4*a* comprised of the crosslinked ionizing radiation decomposable photosensitive resin layer due to the solvent comprising cyclohexanone or the constituent resin of the coating resin layer.

Figure 23:
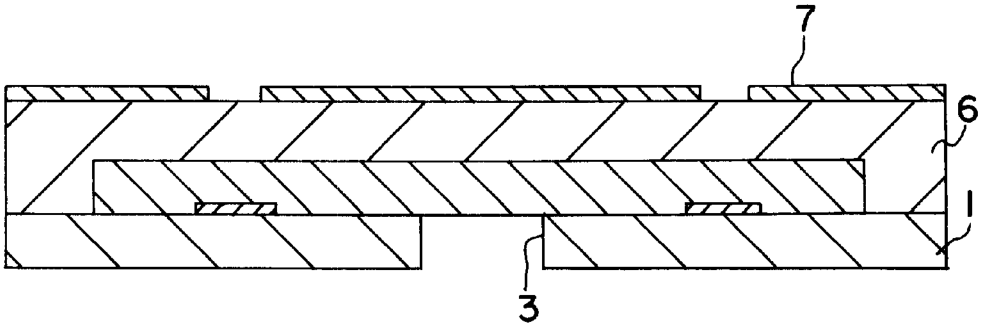

Thereafter, as shown in FIG. 23, on the coating resin layer 6, a silicon series negative photoresist SNR-M2 (trademark name, produced by Toso Kabushiki Kaisha) was spin-coated at a thickness of 0.6 $\mu$m, followed by subjecting to prebaking treatment at 80° C. for 20 minutes, thereby forming a resist film 7, on the coating resin layer 6. A patterning mask for the formation of discharging outlets was then superposed on the resist film 7, followed by subjecting to exposure for 20 seconds using a PLA-520FA (using cold mirror CM-250). Successively, development was conducted using a solvent comprising propyleneglycol-α-monomethyl ether/di-n-butyl ether (=5/2 in terms of volume ratio), and rinsing was conducted using a solvent comprising propyleneglycol-α-monomethyl ether/di-n-butyl ether (=1/1 in terms of volume ratio). Thus, there were formed discharging outlet-forming patterns.

Herein, the silicon series resist used is a negative resist. Therefore, a given pattern is formed in extraction and therefore, it is considered that there would entail a problem in forming a fine pattern. However, when the resist film used is thin, it is possible to form a pattern of about 2 $\mu$m in diameter.

In this example, the resultant discharging outlet-forming patterns were found to be of 25 $\mu$m in diameter.

Figure 24:
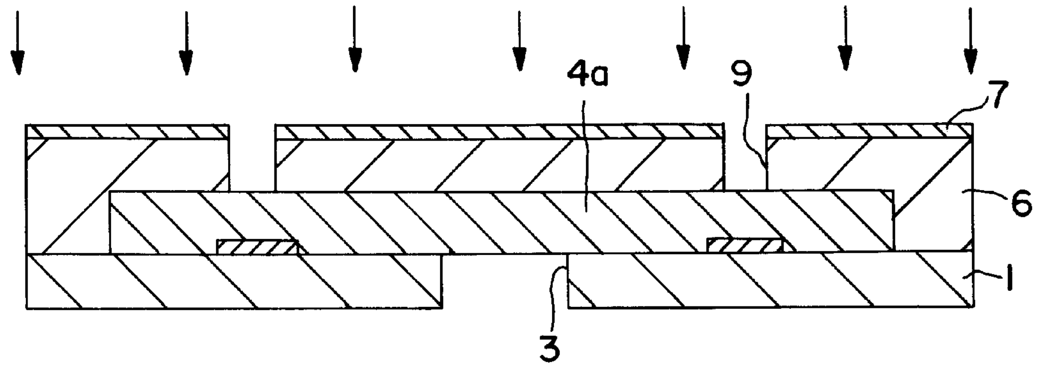

Then, as shown in FIG. 24, the substrate 1 was introduced into a parallel flat etching apparatus DEM-451 (trademark name, produced by Anelba Company), wherein the coating resin layer 6 was subjected to dry etching using oxygen plasma under conditions of 8 Pa for the oxygen gas pressure, 150 W for the power applied, 30 minutes for the etching time, and 0.4 $\mu$m/min. for the etching speed. By this, there were formed penetrated portions as discharging outlets 9 at the coating resin layer 6.

Herein, by properly changing the oxygen gas pressure and the power applied, it is possible to vary the degree of the etching anisotropy, wherein the configuration of the discharging outlets 9 in the depth direction can be properly controlled. And in the case of using a magnetron etching apparatus, it is possible to make the etching speed faster still.

Figure 25:
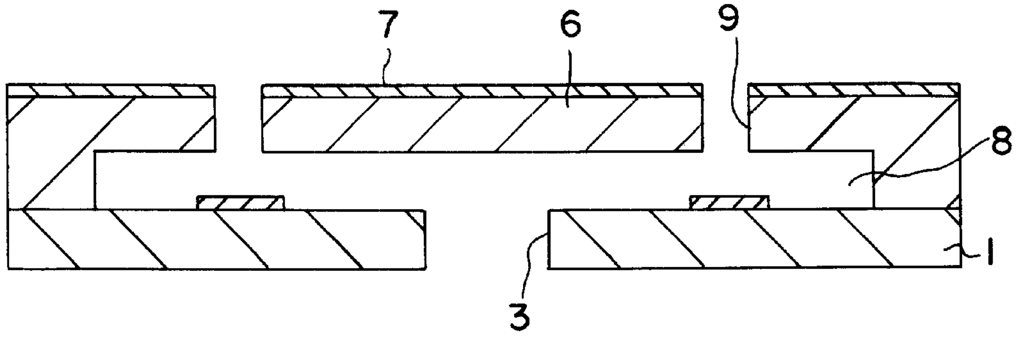

Thereafter, in order to remove the ink pathway-forming pattern 4*a*, using the mask aligner PLA-520FA (using cold mirror-CM-290), ionizing radiation was irradiated to the ink pathway-forming pattern 4*a* through the coating resin layer for 2 minutes, thereby the ink pathway-forming pattern 4*a* was solubilized. Then, the substrate 1 was immersed in methylisobutyl ketone for 15 seconds while effecting ultrasonic wave thereinto, thereby the ink pathway-forming pattern 4*a* was eluted to remove it. By this, there was formed an ink pathway 8 (see, FIG. 25).

Thus, there was obtained an ink jet head.

In the above, the copolymer by which the coating resin layer is constituted is of the ionizing radiation decomposable type, but because of using the amine hardening agent, the crosslinking proceeds at a high density. Therefore, the decomposition reaction occurring when the PLA-520FA is used can be disregarded.

EXAMPLE 2

In the same manner as in Example 1, there was first provided a substrate 1 made of silicon for an ink jet head which is provided with energy generating elements 2 each comprising an electrothermal converting element (comprised of $HfB_2$) capable of generating energy utilized for discharging ink and an ink supply port 3.

Separately, there was prepared a dry film by applying a coating liquid comprising a 20 wt. % diacetone alcohol solution obtained by dissolving, in diacetone alcohol, 100 parts by weight of a copolymer of methylisopropenyl ketone and glycidyl dimethacrylate (copolymerization ratio: 8/2, weight average molecular weight: about 150000) and 2 parts by weight of a cationic polymerization initiator comprising IRUGACURE-261 (produced by Ciba-Geigy Company) onto an aramid film, and subjecting the liquid coat formed on the aramid film to drying.

Then, the dry film thus formed on the aramid film was transferred onto the substrate 1 by means of a laminator at 120° C. to thereby form a ionizing radiation decomposable photosensitive resin layer 4 on the substrate so as to cover the energy generating elements 2 situated on the substrate.

Using a mask aligner PLA-501FA (produced by Canon Kabushiki Kaisha), the photosensitive resin layer 4 was subjected to exposure at a principal emission line of 366 nm for 10 minutes, and thereafter, the photosensitive resin layer was baked at 100° C. for 30 minutes, thereby the epoxy ring of the glycidyl dimethacrylate of the foregoing copolymer contained in the photosensitive resin layer was subjected to ring-opening polymerization to crosslink the photosensitive resin layer. In the above exposure process, no decomposition reaction substantially occurred at the methylisopropenyl ketone/glycidyl dimethacrylate copolymer.

Successively, using the mask aligner PLA-520FA (using cold mirror-CM-290), ionizing radiation was irradiated to only a predetermined portion of the crosslinked photosensitive resin layer, which does not contribute to the formation of an ink pathway, for 70 seconds, whereby said predetermined portion was solubilized. Thereafter, the solubilized portion of the photosensitive resin layer 4 was eluted with the use of methylisobutyl ketone to remove the solubilized portion, followed by rinsing with xylene, thereby forming an ink pathway-forming pattern 4*a* comprised of the remaining crosslinked photosensitive resin layer (in a non-solubilized state).

The thickness of the resultant ink pathway-forming pattern 4*a* was found to be 12 μm.

Then, a coating resin layer 6 was formed on the substrate 1 so as to cover the ink pathway-forming pattern 4*a* in the following manner. That is, a mixture of 70 parts by weight of a bisphenol A type epoxy resin EPICOTE 1003 (produced by Yuka Shell Kabushiki Kaisha), 26 parts of a propylene oxide-modified bisphenol A type epoxy resin EPOLITE 3002 (produced by Kyoei Kabushiki Kaisha) and 4 parts by weight of a hardener comprising diethylenetetramine was dissolved in cyclohexanone to obtain a cyclohexanone solution containing 50 wt. % of said mixture as a coating liquid. The resultant solution was applied onto the substrate 1 so as to cover the ink pathway-forming pattern 4*a* using a spinner, followed by subjecting to heat treatment at 100° C. for 3 hours and successively to hardening treatment at 150° C. for an hour, thereby a 10 μm thick resin film as the coating resin layer 6 was formed on the ink pathway-forming pattern 4*a*. In this process of forming the coating resin layer 6, no deformation occurred at the ink pathway-forming pattern 4*a* comprised of the crosslinked ionizing radiation decomposable photosensitive resin layer due to the solvent comprising cyclohexanone or the constituent resin of the coating resin layer.

Thereafter, there was formed a resist film 7 on the coating resin layer 6 in the same manner as in Example 1. A patterning mask for the formation of discharging outlets was then superposed on the resist film 7, followed by subjecting to exposure for 20 seconds using the PLA-520FA (using cold mirror CM-250). Successively, development was conducted using a solvent comprising propyleneglycol-α-monomethyl ether/di-n-butyl ether (=5/2 in terms of volume ratio), and rinsing was conducted using a solvent comprising propyleneglycol-α-monomethyl ether/di-n-butyl ether (=1/1 in terms of volume ratio). Thus, there were formed discharging outlet-forming patterns.

Then, the substrate 1 was introduced into the parallel flat etching apparatus DEM-451, wherein the coating resin layer 6 was subjected to dry etching using oxygen plasma under conditions of 8 Pa for the oxygen gas pressure, 180 W for the power applied, and 1 hour for the etching time. By this, there were formed penetrated portions as discharging outlets 9 at the coating resin layer 6.

Thereafter, in order to remove the ink pathway-forming pattern 4*a*, using the mask aligner PLA-520FA (using cold mirror-CM-290), ionizing radiation was irradiated to the ink pathway-forming pattern 4*a* through the coating resin layer for 2 minutes, thereby the ink pathway-forming pattern 4*a* was solubilized. Then, the substrate 1 was immersed in methylisobutyl ketone for 15 seconds while effecting ultrasonic wave thereinto, whereby the ink pathway-forming pattern 4*a* was eluted to remove it. By this, there was formed an ink pathway 8.

Thus, there was obtained an ink jet head.

EXAMPLE 3

In the same manner as in Example 1, there was first provided a substrate 1 made of silicon for an ink jet head which is provided with energy generating elements 2 each comprising an electrothermal converting element (comprised of $HfB_2$) capable of generating energy utilized for discharging ink and an ink supply port 3.

Separately, there was prepared a dry film by applying a coating liquid comprising a cyclohexanone solution containing 25 wt. % of a copolymer of methylisopropenyl ketone, methylmethacrylate and methacrylic acid (copolymerization ratio: 4/4/2, weight average molecular weight: about 150000) onto a PET film and subjecting the liquid coat formed on the PET film to drying.

Then, the dry film thus formed on the PET film was transferred onto the substrate 1 by means of a laminator at 130° C. to thereby form a ionizing radiation decomposable photosensitive resin layer 4 on the substrate so as to cover the energy generating elements 2 situated on the substrate. The photosensitive resin layer 4 was prebaked at 130° C. for 10 minutes and successively baked at 180° C. for 30 minutes to crosslink the photosensitive resin layer 4.

Successively, using the mask aligner PLA-520FA (using cold mirror-CM-290), ionizing radiation was irradiated to only a predetermined portion of the crosslinked photosensitive resin layer, which does not contribute to the formation of an ink pathway, for 1.5 minutes, whereby said predetermined portion was solubilized. Thereafter, the solubilized portion of the photosensitive resin layer 4 was eluted with the use of a solvent comprised of methylisobutyl ketone and xylene (=1/1) to remove the solubilized portion, followed by rinsing with xylene, thereby forming an ink pathway-forming pattern 4*a* comprised of the remaining crosslinked photosensitive resin layer (in a non-solubilized state). The thickness of the resultant ink pathway-forming pattern 4*a* was found to be 15 μm.

Thereafter, in accordance with the procedures in Example 2, a coating resin layer 6 was formed on the ink pathway-forming pattern 4*a*, discharging outlets 9 were formed at the coating resin layer 6, and an ink pathway 8 was formed, whereby an ink jet head was obtained.

EXAMPLE 4

At first, a substrate 1 for an ink jet head was prepared in the following manner. That is, energy generating elements 2 each comprising an electrothermal converting element (comprised of $HfB_2$) capable of hafnium boride generating energy utilized for discharging ink were spacedly disposed on the surface of a silicon substrate 1 of (100) in lattice plane at an equal interval. Then, a mask comprised of $Si_3N_4$ capable of serving to form an ink supply port 3 was formed at a predetermined position of the rear face of the silicon substrate by way of anisotropic etching. Thus, there was obtained the substrate 1 for an ink jet head.

Then, using a spinner, a coating liquid comprising a cyclohexanone solution containing 18 wt. % of a copolymer of methylisopropenyl ketone and methacrylic acid chloride (copolymerization ratio; 85/15, weight average molecular weight: about 200000) was applied on the substrate 1 so as to cover the energy generating elements 2, followed by drying the liquid coat formed on the silicon substrate 1 at 110° C. for 3 minutes, thereby a ionizing radiation decomposable photosensitive resin layer 4 was formed on the silicon substrate 1. Thereafter, the photosensitive resin layer 4 was baked at 150° C. for an hour to crosslink the photosensitive resin layer.

Successively, using the mask aligner PLA-520FA (using cold mirror-CM-290), ionizing radiation was irradiated to only a predetermined portion of the crosslinked photosensitive resin layer, which does not contribute to the formation of an ink pathway, for 2 minutes, whereby said predetermined portion was solubilized. Thereafter, the solubilized portion of the photosensitive resin layer 4 was eluted with the use of methylisobutyl ketone to remove the solubilized portion, followed by rinsing with xylene, thereby forming an ink pathway-forming pattern 4*a* comprised of the remaining crosslinked photosensitive resin layer (in a non-solubilized state). The thickness of the resultant ink pathway-forming pattern 4*a* was found to be 11 μm.

Then, a coating resin layer 6 was formed on the substrate 1 so as to cover the ink pathway-forming pattern 4*a* in the following manner. That is, a mixture of 100 parts by weight of an epoxy resin EHPE 3150 (produced by Daiseru Kagaku Kogyo Kabushiki Kaisha), 20 parts of weight of an epoxy resin EPICOTE 1002 (produced by Yuka Shell Kabushiki Kaisha), a silane coupling agent A187 (produced by Nippon Unicar Kabushiki Kaisha), and a cationic polymerization initiator SP170 (produced by Adeca Company) was dissolved in cyclohexanone to obtain a cyclohexanone solution containing 50 wt. % of said mixture as a coating liquid. The resultant solution was applied onto the substrate 1 so as to cover the ink pathway-forming pattern 4*a* using a spinner, followed by subjecting to drying at 90° C. for 5 minutes, thereby a 12 μm thick coating resin layer 6 was formed on the ink pathway-forming pattern 4*a*.

Herein, the resultant coating resin layer 6 had a negative photosensitive property (which means that only a portion thereof irradiated with light is hardened). Therefore, as shown in FIG. 18, the coating resin layer 6 was subjected to patterning exposure using a patterning mask 7. Particularly, using a mask aligner MPA-600 (produced by Canon Kabushiki Kaisha), the coating resin layer 6 was subjected to exposure at a principal emission line of 366 nm and at an exposure value of 3 $J/cm^2$. Herein, no decomposition reaction substantially occurred at the ink pathway-forming pattern. The coating resin layer thus treated was heated at 90° C. for 5 minutes, and the non-exposed portions of the coating resin layer were removed by eluting them with the use of methylisobutyl ketone, whereby discharging outlets 9 were formed at the coating resin layer 6.

Then, in order to form the ink supply port 3 at the silicon substrate 1, anisotropic etching was conducted at 80° C. using an anisotropic etching solution comprising an aqueous solution containing 22 wt. % of tetramethylammonium hydroxide while preventing the etching solution from reaching the surface side of the silicon substrate.

Thereafter, in accordance with the procedures in Example 1, the ink pathway-forming pattern 4*a* was removed to form an ink pathway 8.

Thus, there was obtained an ink jet head.

EXAMPLE 5

Figure 26:
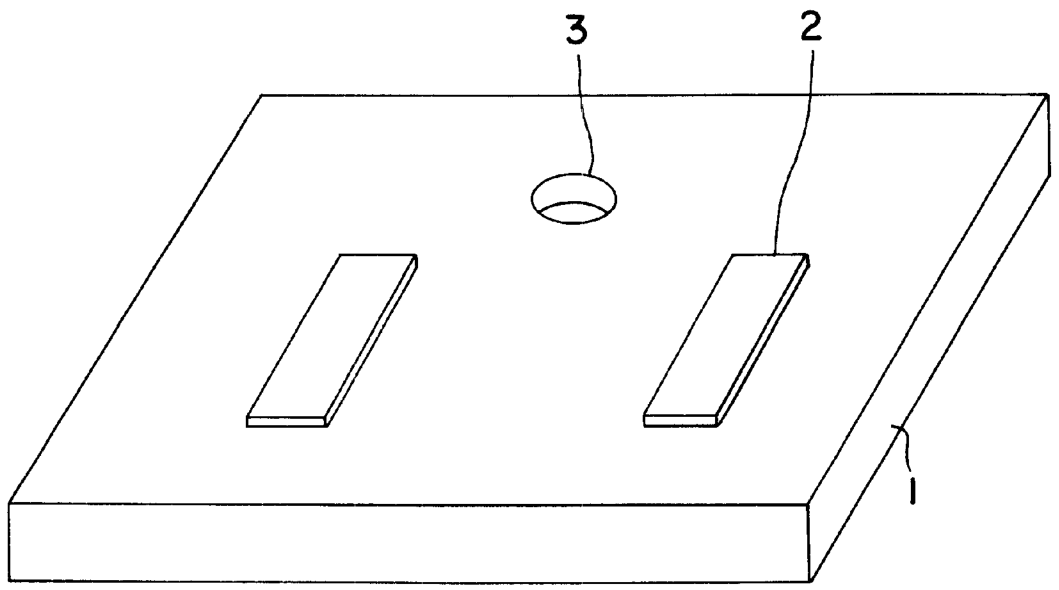
FIGS. 26 to 31 are schematic views for explaining production steps of producing an ink jet head in Examples 5 and 6 belonging to the second embodiment of the present invention, which will be later described.

In the same manner as in Example 1, there was first provided a substrate 1 made of silicon for an ink jet head which is provided with energy generating elements 2 each comprising an electrothermal converting element (comprised of $HfB_2$) capable of generating energy utilized for discharging ink and an ink supply port 3 (see, FIG. 26).

Separately, there was prepared a dry film by applying a coating liquid comprising a cyclohexanone solution containing 18 wt. % of a copolymer of methylmethacrylate and methacrylic acid (copolymerization ratio: 8/2, weight average molecular weight: about 180000) onto an aramid film, and subjecting the liquid coat formed on the aramid film to drying.

Figure 27:
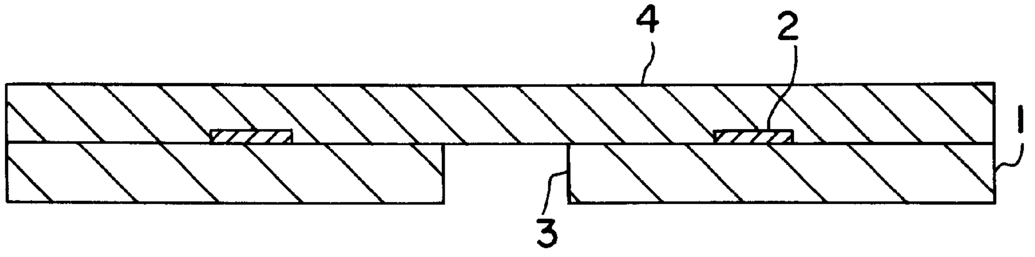

Then, as shown in FIG. 27, the dry film thus formed on the aramid film was transferred onto the substrate 1 by means of a laminator at 120° C., to thereby form a ionizing radiation decomposable photosensitive resin layer 4 on the substrate so as to cover the energy generating elements 2 situated on the substrate. The photosensitive resin layer 4 thus formed on the substrate 1 was baked at 180° C. for an hour to crosslink the photosensitive resin layer into a crosslinked photosensitive resin layer in a state of being substantially insoluble in organic solvents.

Figure 28:
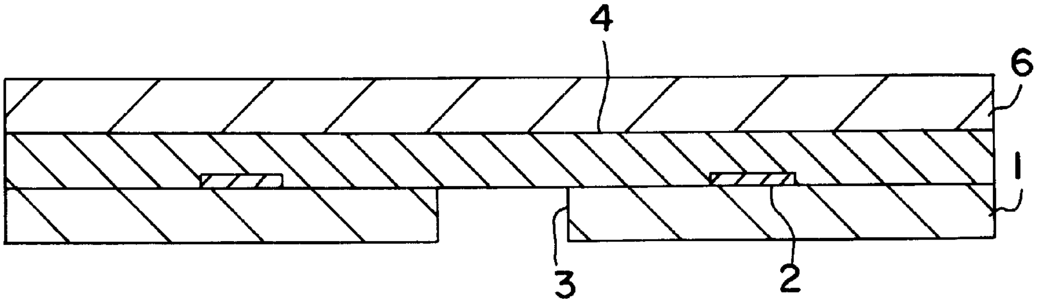

Thereafter, as shown in FIG. 28, in accordance with the procedures of forming the coating resin layer 6 in Example 4, a coating resin layer 6 composed of a negative photosensitive resin was formed on the crosslinked photosensitive resin layer 4. In this process of forming the coating resin layer 6, the crosslinked ionizing radiation decomposable photosensitive resin layer 4 suffered from no negative influence due to the solvent used for the formation of the coating resin layer or the constituent resin of the coating resin layer.

Figure 29:
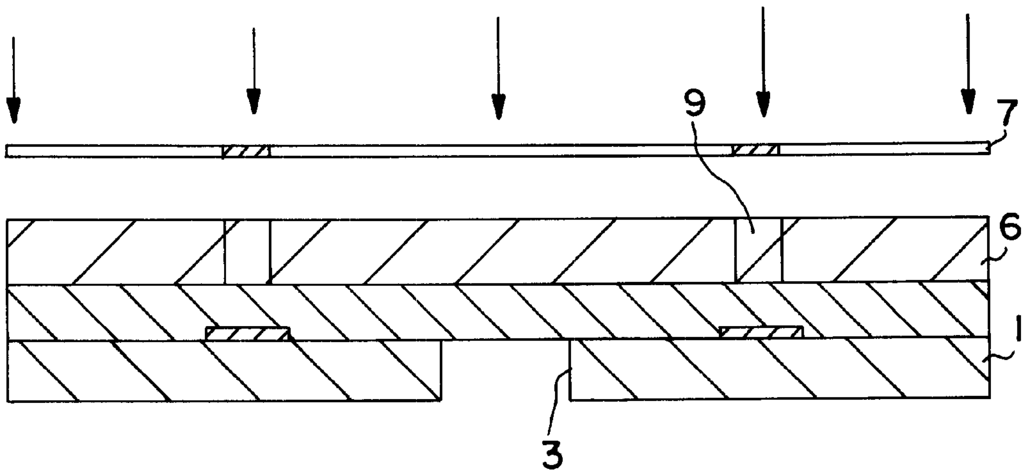

Then, as shown in FIG. 29, in accordance with the discharging outlet-forming procedures in Example 4, there were formed discharging outlets 9 at the coating resin layer 6, e.g. using a patterning mask 7.

Figure 30:
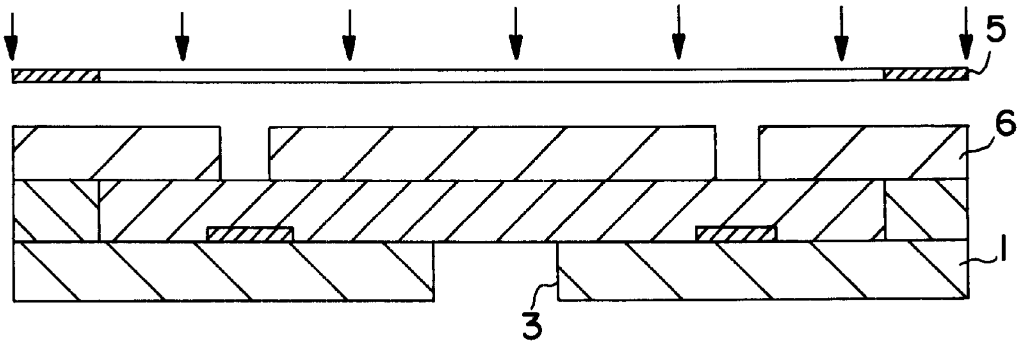
Figure 31:
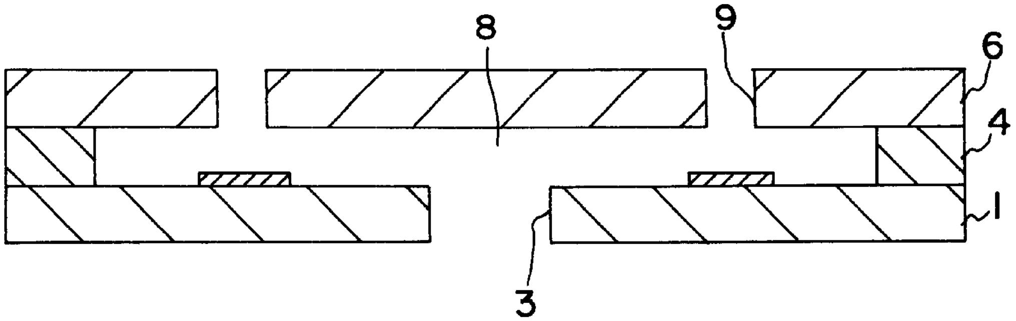

Thereafter, as shown in FIG. 30, using an ink pathway-forming patterning mask 5 and using a 2KW-deep-UV exposure device (produced by Ushio Denki Kabushiki Kaisha), ionizing radiation was irradiated to only a predetermined ink pathway-forming portion of the photosensitive resin layer 4 through said pattering mask 5 and the coating resin layer 6 for 10 minutes, whereby a ink pathway-forming pattern 4*a* in a solubilized state was formed at the photosensitive resin layer 4.

Sucessively, the ink pathway-forming pattern 4*a* was removed by way of elution in the same manner as in Example 1, thereby forming an ink pathway 8.

Thus, there was obtained an ink jet head.

EXAMPLE 6

In the same manner as in Example 1, there was first provided a substrate 1 made of silicon for an ink jet head which is provided with energy generating elements 2 each comprising an electrothermal converting element (comprised of $HfB_2$) capable of generating energy utilized for discharging ink and an ink supply port 3.

Separately, there was prepared a dry film by applying a coating liquid comprising a 20 wt. % cyclohexanone solution obtained by dissolving, in cyclohexanone, 100 parts by weight of a copolymer of methylmethacrylate and glycidyl methacrylate (copolymerization ratio: 9/1, weight average molecular weight: about 180000) and 2 parts by weight of a cationic polymerization initiator comprising an IRUGACURE-261 (produced by Ciba-Geigy Company) onto an aramid film, and subjecting the liquid coat formed on the aramid film to drying.

Then, the dry film thus formed on the aramid film was transferred onto the substrate 1 by means of a laminator at 120° C., to thereby form a ionizing radiation decomposable photosensitive resin layer 4 on the substrate so as to cover the energy generating elements 2 situated on the substrate.

Using the mask aligner PLA-501PA, the photosensitive resin layer 4 was subjected to exposure at a principal emission line of 366 nm for 10 minutes, and thereafter, the photosensitive resin layer was baked at 110° C. for 15 minutes, whereby the epoxy ring of the glycidyl methacrylate of the foregoing copolymer contained in the photosensitive resin layer was subjected to ring-opening polymerization to crosslink the photosensitive resin layer. In the above exposure process, no decomposition reaction substantially occurred at the copolymer comprised of methylmethacrylate/glycidyl methacrylate.

Then, in accordance with the procedures of forming the coating resin layer 6 in Example 1, a coating resin layer 6 composed of the same constituent material as that of the coating resin layer 6 in Example 1 was formed on the crosslinked photosensitive resin layer 4. Thereafter, in accordance with the discharging outlet-forming procedures in Example 1, there were formed discharging outlets 9 at the coating resin layer 6.

Successively, as well as in the case of Example 5, using the ink pathway-forming patterning mask 5 and using the 2KW-deep-UV exposure device, ionizing radiation was irradiated to only a predetermined ink pathway-forming portion of the photosensitive resin layer 4 through said patterning mask 5 and the coating resin layer 6 for 10 minutes, whereby a ink pathway-forming pattern 4*a* in a solubilized state was formed at the photosensitive resin layer 4.

Then, the ink pathway-forming pattern 4*a* was removed by way of elution in the same manner as in Example 1, thereby forming an ink pathway 8.

Thus, there was obtained an ink jet head.

Comparative Example 1

In the same manner as in Example 1, there was first provided a substrate 1 made of silicon for an ink jet head which is provided with energy generating elements 2 each comprising an electrothermal converting element (comprised of $HfB_2$) capable of generating energy utilized for discharging ink and an ink supply port 3.

Then, an OZATEC R-255 (trademark name, produced by Hoechst Company) was laminated onto the substrate 1 as a positive type dry film by means of a laminator, to thereby form a photosensitive resin layer 4 on the substrate so as to cover the energy generating elements 2 situated on the substrate. Herein, the OZATEC R-255 is a resist comprised of a novolak resin and a dissolution prohibiting agent.

The photosensitive resin layer 4 thus formed on the substrate 1 was baked at 110° C. for 20 minutes.

Thereafter, using the mask aligner PLA-501FA, the photosensitive resin layer 4 was subjected to patterning by way of exposure, followed by development with the use of a developer MIF-312 (produced by Hoechst Company), to thereby form an ink pathway-forming pattern 4*a*.

Successively, in accordance with the procedures of Example 1, without having conducted the irradiation of ionizing radiation to the ink pathway-forming pattern 4*a* as in Example 1 because the constituent resin of the ink pathway-forming pattern 4*a* was not such ionizing radiation decomposable photosensitive resin as in Example 1, a coating resin layer 6 composed of the same constituent material as that of the coating resin layer 6 in Example 1 was formed on the substrate 1 so as to cover the ink pathway-forming pattern 4*a* and discharging outlets were formed at the coating resin layer 6, followed by removing the ink pathway-forming pattern 4*a* by way of elution to form an ink pathway 8.

Thus, there was obtained an ink jet head.

Comparative Example 2

In the same manner as in Example 1, there was first provided a substrate 1 made of silicon for an ink jet head which is provided with energy generating elements 2 each comprising an electrothermal converting element (comprised of $HfB_2$) capable of generating energy utilized for discharging ink and an ink supply port 3.

Separately, there was prepared a dry film by applying a coating liquid comprising a cyclohexanone solution containing 20 wt. % of a copolymer of methylmethacrylate and methacrylic acid (copolymerization ratio: 8/2, weight average molecular weight: about 120000) onto an aramid film, and subjecting the liquid coat formed on the aramid film to drying.

Then, the dry film thus formed on the aramid film was transferred onto the substrate 1 by means of a laminator, to thereby form a ionizing radiation decomposable photosensitive resin layer 4 on the substrate so as to cover the energy generating elements 2 situated on the substrate.

The photosensitive resin layer thus formed on the substrate 1 was then prebaked at 120° C. for 30 minutes. In this case, it found that no crosslinking reaction was substantially occurred in the photosensitive resin layer.

Thereafter, by repeating the procedures of forming the ink pathway-forming pattern 4*a*, the coating resin layer 6 and the discharging outlets 9, an ink pathway-forming pattern 4*a* was formed, a coating resin layer 6 was formed on the substrate 1 so as to cover the ink pathway-forming pattern 4*a*, and discharging outlets 9 were formed at the coating resin layer 6. Successively, the ink pathway-forming pattern 4*a* was removed by way of elution in the same manner as in Example 1 to thereby form an ink pathway 8.

Thus, there was obtained an ink jet head.

Comparative Example 3

In the same manner as in Example 1, there was first provided a substrate 1 made of silicon for an ink jet head which is provided with energy generating elements 2 each comprising an electrothermal converting element (comprised of $HfB_2$) capable of generating energy utilized for discharging ink and an ink supply port 3.

Separately, there was prepared a dry film by applying a coating liquid comprising a cyclohexanone solution containing 20 wt. % of a copolymer of methylmethacrylate and methacrylic acid (copolymerization ratio: 8/2, weight average molecular weight: about 120000) onto an aramid film, and subjecting the liquid coat formed on the aramid film to drying.

Then, the dry film thus formed on the aramid film was transferred onto the substrate 1 by means of a laminator, to thereby form a ionizing radiation decomposable photosensitive resin layer 4 on the substrate so as to cover the energy generating elements 2 situated on the substrate. The photosensitive resin layer 4 thus formed on the substrate 1 was baked at 200° C. for 30 minutes to crosslink the photosensitive resin layer into a crosslinked photosensitive resin layer in a state of being substantially insoluble in organic solvents.

Thereafter, using the ink pathway-forming patterning mask 5 and using the 2KW-deep-UV exposure device, ionizing radiation was irradiated to only a predetermined ink pathway-forming portion of the photosensitive resin layer 4 through said pattering mask 5 for 10 minutes, whereby a ink pathway-forming pattern 4*a* in a solubilized state was formed at the photosensitive resin layer 4.

Then, without conducting development for the photosensitive resin layer 4, by repeating the procedures of forming the coating resin layer 6 and the discharging outlets 9 in Example 2, a coating resin layer 6 was formed on the substrate 1 so as to cover the photosensitive resin layer 4, and discharging outlets 9 were formed at the coating resin layer 6. Successively, the ink pathway-forming pattern 4*a* was removed by way of elution in the same manner as in Example 1 to thereby form an ink pathway 8.

Thus, there was obtained an ink jet head.

Evaluation

1. As for each of the ink jet heads obtained in Examples 1 to 6 and in Comparative Examples 1 to 3, the shape of the ink pathway was examined by means of a microscope. Herein, the coating resin layer of any of these ink jet heads is hyaline and therefore, it is possible to examine the shape of the ink pathway through the coating resin layer.

As a result, it was found that the ink pathway of any of the ink jet heads obtained in Examples 1 to 6 is in a desirable state with no deformation.

On the other hand, as for the ink jet head obtained in Comparative Example 1, it was found that the ink pathway is significantly deformed and is in a practically unacceptable state. As for the ink jet head obtained in Comparative Example 2, it was found that the ink pathway is partially deformed. As for the ink jet head obtained in Comparative Example 3, it was found that a thin film-like residue is present at the latent-image formed interface between the coating resin layer and the photosensitive resin layer. It is considered that these defects found in the ink jet heads obtained in Comparative Examples 1 to 3 would occur due to the reason that as the solvent used upon the formation of the coating resin layer has a strong dissolving power, the ink pathway-forming portion of the photosensitive resin layer would have been partly dissolved by the strong dissolving power-possessing solvent to result in making the resulting ink pathway in such deformed state.

2. As for each of the ink jet heads obtained in Examples 1 to 6 and in Comparative Examples 1 to 3, its ink jet head performance was evaluated in the following manner. That is, each ink jet head was set to an ink jet apparatus used for experimental purposes, wherein using ink comprised of a composition of pure water/glycerin/direct black 154 (water-soluble black dye) (=65/30/5 in terms of wt. %), test printing was conducted for A4 sized sheets.

As a result, as for each of the ink jet heads obtained in Examples 1 to 6, it was found that the ink jet head stably and continuously exhibits a satisfactory ink discharging performance and always provides a satisfactory print product.

On the other hand, in the case of the ink jet head obtained in Comparative Example 1, the ink jet head did not exhibit normal ink discharging performance from the beginning. In the case of the ink jet head obtained in Comparative Example 2, some of the print products provided were found to have a certain distorted portion. In the case of the ink jet head obtained in Comparative Example 3, it exhibited defective ink discharging performance to provide print products accompanied by white lines.

Based on the evaluated results, it was found that according to the process of the present invention, there can be effectively produced a high quality ink jet head even in the case of using a solvent having a strong dissolving power upon the formation of the coating resin layer.

EXAMPLE 7

The procedures of Example 4 were repeated, except that the starting silicon substrate 1 for an ink jet head was changed to a silicon wafer substrate of 5 inches in size having a number of energy generating elements 3 spacedly arranged thereon so that 200 ink jet head units can be formed and each of the 200 ink jet head units on the resultant finally obtained was cut, to thereby obtain 200 ink jet heads. In this example, as the solvent used upon the formation of the coating resin layer, cyclohexanone (having a strong dissolving power) was used.

Comparative Example 4

The procedures of Example 7 were repeated, except that the solvent cyclohexanone used upon the formation of the coating resin layer was changed to a solvent composed of toluene/cyclohexanone (=9/1 in terms of weight ratio), to thereby obtain 200 ink jet heads.

Evaluation

As for the 200 ink jet heads obtained in each of Example 7 and Comparative Example 4, they were subjected to the ink discharging test in order to examine the yield.

As a result, the yield as for the 200 ink jet heads obtained in Example 7 was found to be 80%. On the other hand, the yield as for the 200 ink jet heads obtained in Comparative Example 4 was found to be 65%.

Now, as for the solvent composed of toluene/cyclohexanone (=9/1 in terms of weight ratio) used in Comparative Example 4, the toluene is its principal component and because of this, it is possible to use conventional novolak series resists as the material for the formation of the ink pathway-forming pattern 4*a*. However, in Comparative Example 4, since the foregoing solvent composed of toluene/cyclohexanone was used upon the formation of the coating resin layer, it is considered that the coating resin layer could not be formed at a uniform thickness and this situation resulted in such reduction in the yield.

Separately, as for the defective ink jet heads in Comparative Example 4, their distribution in the silicon wafer of 5 inches in size was examined. As a result, it was found that the ink jet heads formed in the peripheral area of the silicon wafer are mostly defective. As for the reason for this, it is considered that in Comparative Example 4, the coating resin layer could not be formed at a uniform thickness in the peripheral area of the silicon wafer.

Based on the evaluated results, it was found that according to the process of the present invention, there can be mass-produced a high quality ink jet head at a high yield by using a solvent having a strong dissolving power upon the formation of the coating resin layer.

As apparent from the above description, the process of the present invention makes it possible to mass-produce a high quality ink jet head at a high yield. Particularly, in the process of the present invention, even if a solvent having a strong dissolving power is used in the coating process of forming the coating resin layer, the coating resin layer is efficiently formed while attaining a desired uniformity for the thickness thereof and without effecting any negative influence on the photosensitive resin layer, wherein a precise ink pathway with no deformation can be effectively formed, resulting in producing a high quality ink jet head at a high yield. In addition, in the process of the present invention, there is no substantial limitation for the solvent used upon the formation of the coating resin layer by the coating process and this situation makes it possible to use resins, which could not have been used for the formation of the coating resin layer in the prior art, for the formation of the coating resin layer.

These significant advantages of the process of the present invention can not be easily provided by the prior art.

What is claimed is:

1. A process for producing an ink jet head including an ink pathway communicated with a discharging outlet, and an energy generating element for generating energy utilized for discharging ink from the discharging outlet, said process comprising the steps of:

(i) providing a substrate provided with said energy generating element thereon;

(ii) forming a photosensitive resin layer comprised of an ionizing radiation decomposable photosensitive resin containing a crosslinkable structural unit on said substrate so as to cover said energy generating element disposed on said substrate, said photosensitive resin containing a hardening agent or a sensitizer and comprising a photosensitive resin having a chemical structure represented by the following general formula (I):

(I)

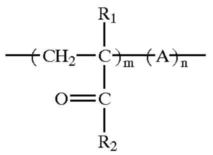

wherein A is a structural unit capable of being crosslinked, $R_1$ is an alkyl group, $R_2$ is a group selected from the group consisting of alkyl groups, substituted and non-substituted aromatic rings, and heterocyclic rings, and m and n are each a positive integer;

(iii) subjecting said photosensitive resin layer to a crosslinking treatment to intermolecular-crosslink a crosslinkable component comprising said crosslinkable structural unit of said photosensitive resin, insolubilizing said photosensitive resin layer to a solvent and patterning said photosensitive resin layer to have a pattern corresponding to said ink pathway;

(iv) forming a coating resin layer on said patterned photosensitive resin layer;

(v) hardening said coating resin layer;

(vi) irradiating ionizing radiation to said patterned photosensitive resin layer through said hardened coating resin layer to decompose said patterned resin photosensitive layer corresponding to the ink pathway; and (vii) eluting said patterned photosensitive resin layer irradiated with said ionizing radiation to thereby form the ink pathway communicated with the discharging outlet.

2. A process for producing an ink jet head according to claim 1, wherein prior to said step of forming a resin coating layer, the process further comprises:

a step of irradiating ionizing radiation to only a predetermined portion of the patterned photosensitive resin layer which does not correspond to the ink pathway to decompose said predetermined portion; and a step of eluting said predetermined portion.

3. A process for producing an ink jet head according to claim 2, wherein the step of forming a coating resin layer includes solvent-coating.

4. A process for producing an ink jet head according to claim 3, wherein the step of forming a coating resin layer includes forming a coating resin layer having curable functional groups.

5. A process for producing an ink jet head according to claim 4 which further comprises a step of forming a discharging outlet in the coating resin layer.

6. A process for producing an ink jet head according to claim 5, wherein the step of forming the discharging outlet includes dry etching using an oxygen plasma.

7. A process for producing an ink jet head according to claim 5, wherein the step of forming the discharging outlet uses photolithography.

8. A process for producing an ink jet head according to claim 5, wherein the step of forming the discharging outlet uses an excimer laser.

9. A process for producing an ink jet head according to claim 3, wherein the step of forming a coating resin layer includes forming a coating resin layer having thermocurable functional groups.

10. A process for producing an ink jet head according to claim 9 which further comprises a step of forming a discharging outlet in the coating resin layer.

11. A process for producing an ink jet head according to claim 10, wherein the step of forming the discharging outlet includes dry etching using an oxygen plasma.

12. A process for producing an ink jet head according to claim 10, wherein the step of forming the discharging outlet uses an excimer laser.

13. A process for producing an ink jet head according to claim 1, wherein the step of irradiating ionizing radiation includes irradiating only a predetermined portion of the patterned photosensitive resin layer which corresponds to the ink pathway to decompose said predetermined portion.

14. A process for producing an ink jet head according to claim 1, wherein the step of forming the coating resin layer includes solvent-coating.

15. A process for producing an ink jet head according to claim 14, wherein the step of forming a coating resin layer includes forming a coating resin layer having photocurable functional groups.

16. A process for producing an ink jet head according to claim 15 which further comprises a step of forming a discharging outlet in the coating resin layer.

17. A process for producing an ink jet head according to claim 16, wherein the step of forming the discharging outlet includes dry etching using an oxygen plasma.

18. A process for producing an ink jet head according to claim 16, wherein the step of forming the discharging outlet uses photolithography.

19. A process for producing an ink jet head according to claim 16, wherein the step of forming the discharging outlet uses an excimer laser.

20. A process for producing an ink jet head according to claim 14, wherein the step of forming a coating resin layer includes forming a coating resin layer having thermocurable functional groups.

21. A process for producing an ink jet head according to claim 20 which further comprises a step of forming a discharging outlet in the coating resin layer.

22. A process for producing an ink jet head according to claim 21, wherein the step of forming the discharging outlet includes dry etching using an oxygen plasma.

23. A process for producing an ink jet head according to claim 21, wherein the step of forming the discharging outlet uses an excimer laser.

24. A process for producing an ink jet head according to claim 1, wherein the step of forming a photosensitive layer includes forming a photosensitive resin layer having a photo-crosslinkable unit.

25. A process for producing an ink jet head according to claim 1, wherein the step of forming a photosensitive layer includes forming a photosensitive resin layer having a thermo-crosslinkable unit.

* * * * *

UNITED STATES PATENT AND TRADEMARK OFFICE

CERTIFICATE OF CORRECTION

PATENT NO. : 6,461,798 B1
DATED : October 8, 2002
INVENTOR(S) : Norio Ohkuma et al.

It is certified that error appears in the above-identified patent and that said Letters Patent is hereby corrected as shown below:

Column 2,
Line 57, "with," should read -- with --.

Column 6,
Line 17, "prevent" should read -- present --.

Column 9,
Lines 43 and 45,

"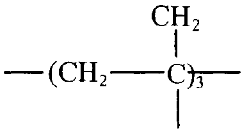" should read -- 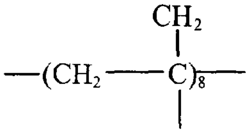 --; and

Lines 59 to 62,

"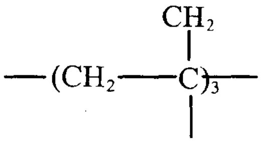" should read -- 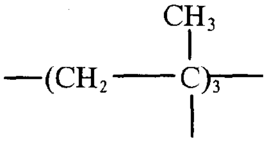 --.

Column 10,
Lines 2 to 5,

"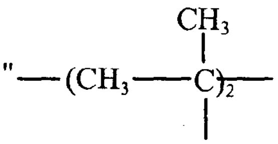" should read -- 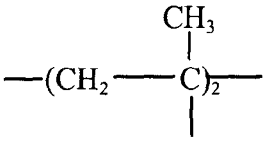 --;

Column 18,
Line 41, "120ºC." should read -- 120ºC., --.

Column 20,
Line 6, "a ionizing" should read -- an ionizing --.

UNITED STATES PATENT AND TRADEMARK OFFICE
CERTIFICATE OF CORRECTION

PATENT NO. : 6,461,798 B1
DATED : October 8, 2002
INVENTOR(S) : Norio Ohkuma et al.

It is certified that error appears in the above-identified patent and that said Letters Patent is hereby corrected as shown below:

Column 24,
Line 10, "it" should read -- it was -- and
"was substantially" should read -- substantially --; and
Line 50, "pattering" should read -- patterning --.

Signed and Sealed this

Twentieth Day of May, 2003

JAMES E. ROGAN
*Director of the United States Patent and Trademark Office*

UNITED STATES PATENT AND TRADEMARK OFFICE

CERTIFICATE OF CORRECTION

PATENT NO. : 6,461,798 B1
DATED : October 8, 2002
INVENTOR(S) : Norio Ohkuma et al.

It is certified that error appears in the above-identified patent and that said Letters Patent is hereby corrected as shown below:

Title page,
Item [*], Notice, "Subject to any disclaimer, the term of this patent is extended or adjusted under 35 U.S.C. 154(b) by 65 days." should read
-- Subject to any disclaimer, the term of this patent is extended or adjusted under 35 U.S.C. 154(b) by 0 days. --

Signed and Sealed this

Fourth Day of November, 2003

JAMES E. ROGAN
*Director of the United States Patent and Trademark Office*